US007770071B2

(12) United States Patent
Jung et al.

(10) Patent No.: US 7,770,071 B2
(45) Date of Patent: Aug. 3, 2010

(54) MOTE SERVICING

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: The Invention Science Fund I, Inc, Bellevue, WA (US)

( * ) Notice: Subject to any disclaimer, the term of this patent is extended or adjusted under 35 U.S.C. 154(b) by 934 days.

(21) Appl. No.: 11/254,231

(22) Filed: Oct. 19, 2005

(65) Prior Publication Data

US 2007/0083789 A1      Apr. 12, 2007

(51) Int. Cl.
G06F 11/00  (2006.01)
(52) U.S. Cl. .......................................... 714/47; 714/44
(58) Field of Classification Search .................. 714/44, 714/47
See application file for complete search history.

(56) References Cited

U.S. PATENT DOCUMENTS

| | | | | |
|---|---|---|---|---|
| 4,595,914 A * | 6/1986 | Siegel ......................... 340/515 |
| 5,052,854 A | 10/1991 | Correa et al. |
| 5,287,113 A | 2/1994 | Meier |
| 5,349,330 A | 9/1994 | Diong et al. |
| 5,415,645 A * | 5/1995 | Friend et al. ................. 604/110 |
| 5,485,163 A | 1/1996 | Singer et al. |
| 5,608,412 A | 3/1997 | Welles, II et al. |
| 5,673,039 A | 9/1997 | Pietzsch et al. |
| 5,721,535 A | 2/1998 | Ikefuji |
| 5,731,691 A | 3/1998 | Noto |
| 5,947,637 A | 9/1999 | Neuling |
| 6,091,959 A | 7/2000 | Souissi et al. |
| 6,206,610 B1 | 3/2001 | Neuling |
| 6,305,874 B1 | 10/2001 | Custers et al. |
| 6,321,067 B1 | 11/2001 | Suga et al. |
| 6,485,978 B1 | 11/2002 | Kirckof et al. |
| 6,592,465 B2 | 7/2003 | Lutz et al. |
| 6,650,800 B2 | 11/2003 | Litvin |
| 6,975,229 B2 | 12/2005 | Carrender |
| 6,989,753 B1 | 1/2006 | Lamming et al. |
| 7,021,857 B2 | 4/2006 | Van Der Poel |
| 7,025,525 B2 | 4/2006 | Van Der Poel |
| 7,051,115 B2 | 5/2006 | Chen et al. |
| 7,075,455 B2 | 7/2006 | Nishimura et al. |
| 7,109,875 B2 * | 9/2006 | Ota et al. ..................... 340/635 |

(Continued)

OTHER PUBLICATIONS

Ahamed et al. "Towards developing sensor networks monitoring as a middleware service." Parallel Processing Workshops, 2004. ICPP 2004 Workshops. Proceedings. Aug. 15-18, 2004.*

(Continued)

*Primary Examiner*—Philip Guyton

(57) ABSTRACT

One aspect can include determining that at least one mote device is operating outside normal operational parameters and should be serviced, and determining at least partially using the at least one mote device that is operationally located within a mote network is not meeting a goal of the at least one mote device with respect to the mote network and should be serviced. Another aspect can include determining that at least one mote device should undergo routine servicing and configuring the at least one mote device to indicate the at least one mote device should undergo the routine servicing.

28 Claims, 17 Drawing Sheets

U.S. PATENT DOCUMENTS

| | | | |
|---|---|---|---|
| 7,136,782 B1 | 11/2006 | Araki et al. | |
| 7,147,400 B2 | 12/2006 | Van Der Poel | |
| 7,276,703 B2 * | 10/2007 | Berkcan et al. | 250/358.1 |
| 7,313,405 B2 | 12/2007 | Tanabe | |
| 7,378,962 B2 * | 5/2008 | Odenwald et al. | 340/539.22 |
| 7,400,594 B2 | 7/2008 | Pereira et al. | |
| 7,406,399 B2 * | 7/2008 | Furem et al. | 702/182 |
| 7,429,936 B2 * | 9/2008 | Paradiso et al. | 340/988 |
| 7,446,801 B2 | 11/2008 | Iizuka | |
| 7,516,848 B1 | 4/2009 | Shakes et al. | |
| 7,526,944 B2 | 5/2009 | Sabata et al. | |
| 7,593,690 B2 | 9/2009 | Song et al. | |
| 2002/0040639 A1 | 4/2002 | Duddleson et al. | |
| 2002/0138602 A1 | 9/2002 | Vinberg | |
| 2003/0012168 A1 | 1/2003 | Elson et al. | |
| 2003/0016834 A1 | 1/2003 | Blanco et al. | |
| 2003/0164763 A1 | 9/2003 | Hisano et al. | |
| 2003/0172221 A1 * | 9/2003 | McNeil | 710/305 |
| 2003/0236866 A1 | 12/2003 | Light | |
| 2004/0005889 A1 * | 1/2004 | Nishimura et al. | 455/423 |
| 2004/0128097 A1 | 7/2004 | LaMarca et al. | |
| 2004/0139110 A1 | 7/2004 | LaMarca et al. | |
| 2004/0215750 A1 | 10/2004 | Stilp | |
| 2005/0062603 A1 | 3/2005 | Fuerst et al. | |
| 2005/0104973 A1 | 5/2005 | Iizuka | |
| 2005/0122231 A1 * | 6/2005 | Varaiya et al. | 340/870.01 |
| 2005/0210340 A1 * | 9/2005 | Townsend et al. | 714/701 |
| 2005/0275532 A1 * | 12/2005 | Ferri et al. | 340/539.26 |
| 2005/0285740 A1 | 12/2005 | Kubach et al. | |
| 2006/0062154 A1 * | 3/2006 | Choy et al. | 370/242 |
| 2006/0109084 A1 | 5/2006 | Yarvis | |
| 2006/0126501 A1 * | 6/2006 | Ramaswamy | 370/221 |
| 2006/0176169 A1 | 8/2006 | Doolin et al. | |
| 2006/0206235 A1 | 9/2006 | Shakes et al. | |
| 2006/0247844 A1 | 11/2006 | Wang et al. | |
| 2007/0041352 A1 | 2/2007 | Frankel et al. | |
| 2007/0046497 A1 | 3/2007 | Jung et al. | |
| 2007/0052543 A1 | 3/2007 | Albarado | |
| 2007/0058634 A1 | 3/2007 | Gupta et al. | |
| 2007/0111735 A1 | 5/2007 | Srinivasan et al. | |
| 2007/0182362 A1 | 8/2007 | Trainor et al. | |
| 2008/0123581 A1 | 5/2008 | Wells et al. | |
| 2008/0174410 A1 | 7/2008 | Sarangapani et al. | |
| 2009/0168305 A1 | 7/2009 | Fleig et al. | |

OTHER PUBLICATIONS

Turon, M. "MOTE-VIEW: A sensor network monitoring and management tool." Embedded Networked Sensors, 2005. EmNetS-II. Proceedings. May 30-31, 2005.*

Hsin, C. "A distributed monitoring mechanism for wireless sensor networks." 1st ACM workshop on Wireless security. Proceedings. Sep. 28, 2002.*

Minhas et al. "Node failure detection and path repairing scheme in virtual circuit routing algorithm for wireless ad hoc micro sensor networks." Emerging Technologies, 2005. Proceedings. Sep. 17-18, 2005.*

Zou et al. "Fault-tolerant self-organization in sensor networks." Lecture Notes in Computer Science. Springer-Berlin/Heidelberg. Jul. 29, 2005.*

Berkely Webs: Wireless Embedded Systems; "Building Sensor Networks with TinyOS"; bearing a date of May 5, 2003; Mobisys Tutorial, San Francisco Powerpoint Presentation; Culler, David; Levis, Phil; Szewczyk, Rob; Polastre, Joe; pp. 1-41; located at http://webs.cs.berkeley.edu; printed on Apr. 15, 2004.

Berkeley Webs: Wireless Embedded Systems; "Publications"; p. 1-3; located at http://webs.cs.berkeley.edu/publications.html; printed on Apr. 12, 2004.

Buonadonna, Phillip; Hill, Jason; Culler, David; "Active Message Communication for Tiny Networked Sensors"; pp. 1-11; printed on Mar. 8, 2004.

Center for the Built Environment; "XYZ on a Chip: Integrated Wireless Sensor Networks for the Control of the Indoor Environment in Buildings"; pp. 1-2; located at http://www.cbe.berkeley.edu/research/briefs-wirelessxyz.htm; bearing a date of 2002; printed on Jan. 27, 2004.

Citris; "Brainy Buildings Conserve Energy"; p. 1-3; located at http://www.citris.berkeley.edu/applications/energy/smartbuildings.html; printed on Jan. 27, 2004.

Citris; "The Real World as One Giant Database"; pp. 1-3; located at http://www.citris.berkeley.edu/newsletter/2003_Newsletters/december_2003/feature.htm; bearing a date of 2003; printed on Apr. 9, 2004.

Gay, David; Levis, Phil; Von Behren, Robert; Welsh, Matt; Brewer, Eric; and Culler, David; "The nesCLanguage: A Holistic Approach to Network Embedded Systems"; pp. 1-10; Intel Research Berkeley, The Intel Corporation; bearing a date of Nov. 2002.

Gelsinger, Pat; Intel.com; "Expanding Moore's Law with Convergance"; pp. 1-4; located at http://www.intel.com/labs/features/em101031.htm; printed on Apr. 9, 2004.

Hill, Jason; Szewczyk, Robert; Woo, Alec; Hollar, Seth; Culler, David; Pister, Kristofer; "System Architecture Directions for Networked Sensors"; ASPLOS 2000; Cambridge; bearing a date of Nov. 2000.

INTEL.COM; "Exploratory Research Deep Networking"; pp. 1-10; located at http://www.intel.com/research/exploratory/heterogenerous.htm; printed on Mar. 25, 2004.

INTEL.COM; "Intel Research Seattle Handheld RFID Reader and Glove"; pp. 1-4; located at http://seattleweb.intel-research.net/projects/guide/projects/iglove/RFIDglove.htm; printed on Aug. 18, 2005.

ISIS NEST: Institute for Software Integrated Systems; "People: The NEST Group"; pp. 1 of 1; located at http://www.isis.vanderbilt.edu/projects.nest/people.html; printed on Apr. 14, 2004.

Jiang, Xiaofan; Polastre, Joseph; Culler, David; "Perpetual Environmentally Powered Sensor Networks"; pp. 1-6; University of California, Berekely Computer Science Department, Berkeley, CA 94720.

Johnson, R. Colin; "Companies test prototype wireless-sensor nets"; EE Times; pp. 1-3; printable version of article located at http://www.eet.com/article/showArticle.jhtml?articleID=9900910; bearing a date of Jan. 29, 2003; printed on Jan. 27, 2004.

Kahn, Kevin C.; Culler, David E.; "Ad Hoc Sensor Networks A New Frontier for Computing Applications"; bearing a date of Apr. 2002; printed on Apr. 9, 2004.

Kling, Ralph; "Intel® Research Mote"; pp. 1-13; Powerpoint Presentation; located at http://webs.cs.berkeley.edu/retreat-1-03/slides/imote-nest-q103-03-dist.pdf; Intel Corporation Research, Santa Clara, CA; printed on Apr. 13, 2004.

Levis, Philip; Culler, David; "Maté: A Tiny Virtual Machine for Sensor Networks"; pp. 1-11; printed on Apr. 12, 2004.

Levis, Philip; Madden, Sam; Gay, David; Polastre, Joseph; Szewczyk, Robert; Woo, Alec; Brewer, Eric; Culler, David; "The Emergence of Networking Abstractions and Techniques in TinyOS"; pp. 1-14; printed on Apr. 13, 2004.

Levis, Philip; Patel, Neil; Culler, David; Shenker, Scott; "Trickle: A Self-Regulating Algorithm for Code Propagation and Maintenance in Wireless Sensor Networks"; printed on Apr. 13, 2004.

Levis, Philip; "Viral Code Propagation in Wireless Sensor Networks"; EECS Department, University of California at Berkeley; printed on Mar. 8, 2004.

Liscano, Ramiro; "Service Discovery in Sensor Networks: An Overview"; Powerpoint Presentation; pp. 1-51; School of Information Technology and Engineering, University of Ottawa, Ottawa, Canada; bearing a date of 2003; printed on Mar. 8, 2004.

"Localization Distributed Embedded Systems"; UCLA Computer Science 213: Localization Systems Powerpoint Presentation; pp. 1-61; bearing a course name of: CS 213/Estrin/Winter 2003; bearing a speaker name of Lewis Girod; bearing a date of Feb. 4, 2003; printed on Mar. 15, 2004.

Madden, Samuel; "Challenges in Sensor Network Query Processing"; Powerpoint Presentation at the Jan. 15, 2002 NEST Retreat; printed on Mar. 8, 2004.

Madden, Samuel; Szewczyk, R.; Franklin, Michael; and Culler, David; "Supporting Aggregate Queries Over Ad-Hoc Wireless Sensor Networks"; pp. 1-10; printed on Mar. 8, 2004.

Madden, Samuel; Szewczyk, R.; Franklin, Michael; Culler, David; "Supporting Aggregate Queries Over Ad-Hoc Wireless Sensor Networks" Powerpoint Presentation; pp. 1-47; $4^{th}$ IEEE Workshop on Mobile Computing; bearing a date of Jun. 21, 2002.

Madden, Samuel; Franklin, Michael J.; Hellerstein, Joseph; M., and Hong, Wei; "The Design of an Acquisitional Query Processor for Sensor Networks"; pp. 1-14; SIGMOD; bearing a date of Jun. 2003.

Raghunathan, Vijay; Kansal, Aman; Hsu, Jason; Friedman, Jonathan; Srivastava, Mani; "Design Considerations for Solar Energy Harvesting Wireless Embedded Systems"; pp. 1-6; Networked and Embedded Systems Lab (NESL), Department of Electrical Engineering, University of California, Los Angeles, CA 90095.

Raghunathan, Vijay; Schurgers, Curt; Park, Sung; Srivastava, Mani B.; "Energy Aware Wireless Sensor Networks" pp. 1-17; Department of Electrical Engineering, University of California, Los Angeles; printed on Mar. 15, 2004.

Roundy, Shad; Steingart, Dan; Frechette, Luc; Wright, Paul; Rabaey, Jan; "Power Sources for Wireless Sensor Networks"; pp. 1-24.

Ryer, Alex; "Light Measurement Handbook"; located at http://www.intl-light.com/handbook; pp. 1-64; copyright 1997; printed on Mar. 8, 2004.

Searchnetworking.Com Definitions; "Jini"; pp. 1-3; located at http://searchnetworking.techtarget.com/sDefinition/0,,sid7_gci212422,00.html; bearing a date of Apr. 10, 2003; printed on Mar. 8, 2004.

Spyropoulos, Akis; Raghavendra, C.S.; "Energy Efficient Communications in Ad Hoc Networks Using Directional Antennas"; Dept. of Electrical Engineering-Systems, University of Southern California; bearing a date of 2002; printed on Feb. 23, 2004.

Steingart, Dan; "Micro Power Systems Overview"; pp. 1-24; located at www.cs.berkeley.edu/~binetude/NEST/feb6.ppt.

Viswanath, Kumar; "Adaptive, Integrated Multicast Routing for Group Communications in Ad-Hoc Networks"; Powerpoint Presentation; pp. 1-12; Computer Engineering Department, University of California, Santa Cruz; printed on Mar. 8, 2004.

Woo, Alec; Tong, Terence; and Culler, David; "Taming the Underlying Challenges of Reliable Multihop Routing in Sensor Networks"; pp. 1-14; *SenSys* '03; bearing a date of Nov. 5-7, 2003; Los Angeles, California, USA.

Zapisek, John; "Energy-Efficient Methods for Wireless Sensor Networks"; pp. 1-17; located at http://www.ics.uci.edu/~jzap/243e/proj/jzapisek_final.html; bearing a date of Spring 2004; printed on Aug. 18, 2005.

Zhao, Feng; Guibas, Leonidas J.; "Wireless Sensor Networks: An Information Processing Approach"; San Francisco: Morgan Kaufmann Publishers-Elsevier Inc.; bearing a copyright date of 2004.

U.S. Appl. No. 11/324,175, Jung et al.
U.S. Appl. No. 11/291,534, Jung et al.
U.S. Appl. No. 11/285,767, Jung et al.
U.S. Appl. No. 11/262,553, Jung et al.
U.S. Appl. No. 11/245,492, Jung et al.

\* cited by examiner

2400 →

```
determining that at least one mote device should undergo routine servicing  2402
```
```
   determining at least partially using the at least one mote device that is at least
   partially located within a mote network should undergo the routine servicing to meet
   a goal of the at least one mote device with respect to the mote network  2420
```

| 14a | |
|---|---|
| 14b | 14c |
| 14d | |

Key To FIG. 14

2400 →

(R)

```
determining that the at least one mote device does not have access to a sufficient power
                                               2406
```
```
determining that a battery of the at least one mote device does not provide a sufficient power
                              to the at least one mote device  2408
```
```
determining that the at least one mote device does not have adequate data storage
                       capabilities to operate properly  2410
```
```
determining that a computation time of the at least one mote device exceeds a prescribed
                                      duration  2412
```
```
              sensing at least one parameter using the at least one mote device  2414
```
```
actuating at least a portion of at least one other device using the at least one mote device
                                               2416
```
```
displaying at least a portion of an image at least partially using the at least one mote device
                                               2418
```
```
                     identifying a sensed condition of the at least one mote device  2419
```

| a mote means for determining that it is operating properly 2502 |

| the mote means for indicating it is to undergo routine servicing even though it has determined that it is operating properly 2504 |

| a mote means for determining that it is operating outside normal operational parameters 2602 |

| the mote means for indicating it is to be serviced based, at least in part, on it determining that it is operating outside normal operational parameters 2604 |

FIG. 16

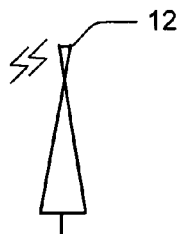

| MOTE DEVICE 11 |   | DISPLACING MECHANISM 2700 (E.G., FLIPS 11) |

FIG. 17

MOTE SERVICING

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith. The United States Patent Office (USPTO) has published a notice to the effect that the USPTO's computer programs require that patent applicants reference both a serial number and indicate whether an application is a continuation or continuation in part. (see CITATION). The present applicant entity has provided below a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

1. U.S. patent application Ser. No. 11/245,492, entitled "MAINTAINING OR IDENTIFYING MOTE DEVICES", naming Edward K.Y. Jung; Royce A. Levien; Robert W. Lord; Mark A. Malamud and John D. Rinaldo, Jr. as inventors, filed 6 Oct. 2005.

TECHNICAL FIELD

Certain aspects of the present application relate, in general, to servicing mote device(s).

SUMMARY

In certain aspects, a method can include, but is not limited to, determining that at least one mote device is operating outside normal operational parameters and should be serviced; and indicating the at least one mote device is to be serviced at least partially in response to the determining that the at least one mote device is operating outside normal operational parameters and should be serviced. In addition to the foregoing, other method aspects are described in the claims, drawings, and text forming a part of the present application.

In certain aspects, a method can include, but is not limited to, determining that at least one mote device should undergo routine servicing; and configuring the at least one mote device to indicate the at least one mote device should undergo the routine servicing. In addition to the foregoing, other method aspects are described in the claims, drawings, and text forming a part of the present application.

In certain aspects, an apparatus can include, but is not limited to, at least one mote device operable to at least partially determine that it is operating outside normal operational parameters and should be serviced; and the at least one mote device operable to indicate it should be serviced at least partially in response to the at least one mote device operable to at least partially determine that it is operating outside normal operational parameters and should be serviced. In addition to the foregoing, other apparatus aspects are described in the claims, drawings, and text forming a part of the present application.

In certain aspects, a method can include, but is not limited to, servicing at least one mote device to control at least one operation that the at least one mote device is configured to perform. In addition to the foregoing, other method aspects are described in the claims, drawings, and text forming a part of the present application.

In certain aspects, an apparatus can include, but is not limited to, at least one mote device operable to at least partially determine that it should undergo routine servicing; and at least one mote device operable to indicate the at least one mote device should be serviced at least partially in response to the at least one mote device operable to at least partially determine that it should undergo routine servicing. In addition to the foregoing, other apparatus aspects are described in the claims, drawings, and text forming a part of the present application.

In certain aspects, an apparatus can include, but is not limited to, a displacing mechanism configurable to displace at least one mote device to indicate the at least one mote device is to undergo servicing. In addition to the foregoing, other apparatus aspects are described in the claims, drawings, and text forming a part of the present application.

In certain aspects, an apparatus can include, but is not limited to, a mote means for determining that it is operating properly; and the mote means for indicating it is to undergo routine servicing even though it has determined that it is operating properly. In addition to the foregoing, other apparatus aspects are described in the claims, drawings, and text forming a part of the present application.

In certain aspects, an apparatus can include, but is not limited to, a mote means for determining that it is operating outside normal operational parameters; and the mote means for indicating it is to be serviced based, at least in part, on it determining that it is operating outside normal operational parameters. In addition to the foregoing, other apparatus aspects are described in the claims, drawings, and text forming a part of the present application.

In one or more various aspects, related apparatus and systems include but are not limited to circuitry and/or programming for effecting the herein-referenced method aspects; the circuitry and/or programming can be virtually any combination of hardware, software, electro-mechanical system, and/or firmware configured to effect the herein-referenced method aspects depending upon the design choices of the system designer.

In addition to the foregoing, various other method and/or system aspects are set forth and described in the text (e.g., claims and/or detailed description) and/or drawings of the present application.

The foregoing contains, by necessity, simplifications, generalizations and omissions of detail; consequently, those skilled in the art will appreciate that the foregoing is illustrative only and not intended to be in any way limiting. Other aspects, features, and advantages of the devices and/or processes and/or other subject matter described herein should become apparent in the text set forth herein.

BRIEF DESCRIPTION OF THE FIGURES

FIG. 12, that includes

FIG. 14, that includes FIGS. 14a, 14b, 14c, and 14d, is a flow diagram of another embodiment of the mote identifying/servicing technique;

FIG. 15 is a flow diagram of an embodiment of the mote servicing technique;

FIG. 16 is a flow diagram of another embodiment of the mote servicing technique; and FIG. 17 is a block diagram of one embodiment of the at least one mote device, and a displacing mechanism that is associated with the at least one mote device.

DETAILED DESCRIPTION

The present disclosure pertains in general to a variety of aspects relating to mote device(s), and in certain aspects their servicing.

The disclosure includes a number of outline headings for clarity of presentation. Different types of subject matter may be discussed throughout areas under different outline headings throughout the disclosure (e.g., device(s)/structure(s) may be described under process(es)/operations heading(s) and/or process(es)/operations may be discussed under structure(s)/process(es) headings; and/or descriptions of single topics may span two or more topic headings, etc.). The formal outline headings, and any heading numbering, are intended to be assistive or illustrative in nature and not in any way limiting.

I. Introduction to Mote Device(s) and Servicing Device(s)

Figure 1:
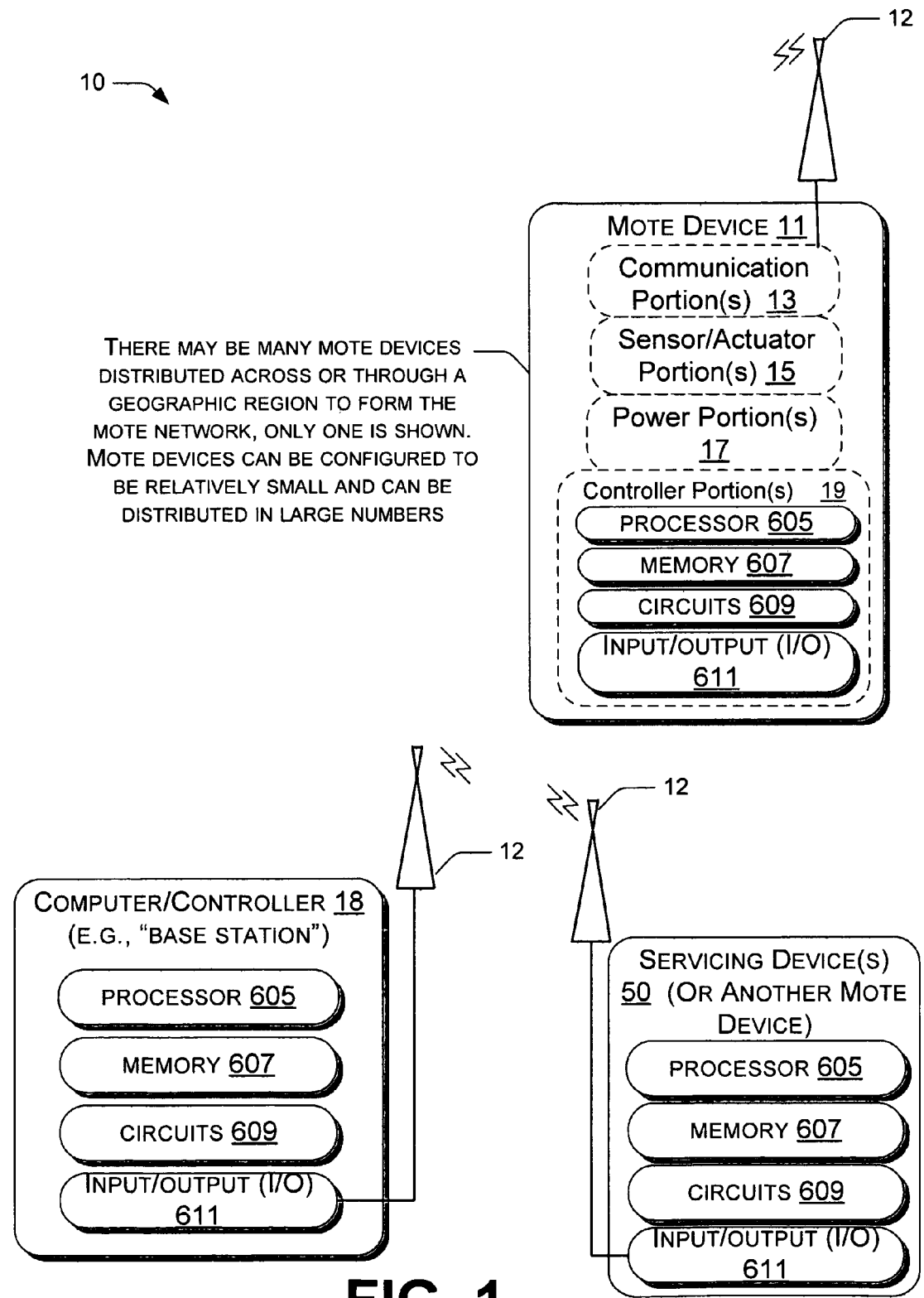
FIG. 1 shows a block diagram of one embodiment of a mote network including at least one mote device.

One embodiment of a mote network 10 that can include a number of mote device(s) 11 is described with respect to FIG. 1, in which the dimensions of the individual devices are not drawn to scale. In general, a mote device can be considered a small processor-driven device that can be configured to perform a variety of functions. Certain embodiments of mote device(s) 11, as described in this disclosure for example, can be configured to sense a variety of parameters, actuate a variety of other devices such as (but not limited to) turn on or off a light emitting diode, and/or at least partially control a display including controllable light elements (e.g., pixels). Certain embodiments of the mote device(s) 11 can be fabricated to be relatively small (typically less than several inches in dimension, often a fraction of an inch). Certain embodiments of mote device(s) 11 can also be relatively inexpensive to produce, and can be designed to stand up to relatively harsh and/or external environments. Many embodiments of mote device(s) can include a power source, which can be configured to provide power or energy to the mote during its normal operations.

As used in this disclosure, the term "mote device" typically indicates a semi-autonomous computing, communication, actuating, and/or sensing device as described in the mote literature (e.g., Intel Corporation's mote literature), as well as equivalents recognized by those having skill in the art (e.g., Intel Corporation's smart dust projects), similar to as illustrated with respect to FIG. 1. Many embodiments of mote device(s) 11, or simply "motes", as described in this disclosure can provide a wide variety of parameter sensing and/or actuating functionalities. Such parameter sensing may be controlled (and/or light or display devices actuated) using computer-based sensing, electro-mechanical sensing, magnetic sensing, and/or other sensing techniques. Certain embodiments of mote device(s) can be located at remote, hostile, external, or inaccessible location(s), which can make access to the mote device(s) for such purposes as servicing, repair, or replacement difficult, expensive, hazardous and/or even virtually impossible. Consider, for example, the inaccessibility of mote device(s) located in concrete to sense the structural integrity of a building, a dam, etc. and/or actuate at least one device(s) that can be actuated by the mote device(s) 11. In these inaccessible embodiments, servicing may have to be performed by a servicing device or person that can be remote from the mote device(s). In one embodiment, servicing of at least one mote device can be indicated in a mote network by providing a status indicator to service the at least one mote device, such as changing surface color, surface reflectivity, generating an acoustic signal, generating a vibration, etc.

This disclosure describes a number of embodiments of status indicators that can be used to indicate that the mote device is operating outside at least one normal operational parameter (e.g., not operating as desired in some detectable manner). In this disclosure, the term "normal" as included in "normal operating parameter" is considered to be normal for that particular mote device. In certain embodiments, multiple status indicators can be associated with at least one mote device(s) to indicate whether each mote device is operating outside of different normal operational parameters. For example, those mote device(s) that are operating outside a first normal operational parameter, such as having insufficient power, etc., as described in this disclosure, can be color coded (or include color coded status indicators such as tags, as described in this disclosure) with a first color, or output a first signal, etc. Those mote device(s) that are operating outside a second normal operational parameter can be color coded (or have their status indicators color coded) with a second color, or output a second signal, etc. As such, those mote device(s) that are to be serviced for operating outside a first normal operating parameter can be easily differentiated (using the servicing device or a servicing person) from those mote device(s) that are to be serviced for operating outside a second normal operating parameter.

A number of servicing devices or servicing persons may be associated with the same mote network, be serviced by a single servicing device, or be serviced by an individual servicing person. Each servicing device can be configured to perform one or more servicing operations including, but not limited to: collecting, maintaining, repairing, replacing, discarding, and/or reconfiguring, etc. of the at least one mote device(s) within that mote network. Mote device(s) can be installed within, (or distributed across) a variety of different environments and/or applications including, but not limited to: across the field, within a structure such as a building, bridge, highway, or dam, underwater, within a vehicle (e.g., to sense an engine parameter or operate a vehicle actuator), etc.

In this disclosure, a variety of techniques are provided to allow mote device(s) to achieve some type of "goal" as a functioning device within the mote network. Examples of such a goal can include, for example, servicing power within the mote device(s), performance of the mote device(s), reliability in individual mote device(s) and/or their batteries across a mote network, ensuring that a particular percentage of the mote device(s) do not fail, etc. Providing certain goals or tasks can provide a considerable challenge and/or expense to the mote network designer, operator, or owner.

An example of a specific goal may be to have some mote device(s) 11 operate during some prescribed time period with less than some prescribed percentage of the mote device(s) within the particular mote network failing. Additionally, balancing data stored in the various mote device(s) across a mote network in a desired fashion (e.g., such that all data can be readily and reliably accessed) can represent another goal for the mote device(s) within the mote network. Also, ensuring that at least one mote device (or certain percentage of mote devices) is operating properly or providing proper output can represent another mote device goal with respect to the mote network. Since it is envisioned that certain mote networks can be configured with a sizable array of mote device(s) 11, servicing of mote device(s) can represent a design-challenge for certain mote networks. This disclosure can therefore provide a number of mechanisms meant to achieve goals such as effectively and efficiently servicing certain desired power levels and/or energy levels, monitoring or controlling data storage, and/or monitoring operational characteristics, etc. within various ones of the mote device(s) 11 with respect to the mote network. In different embodiments, the ability of the mote device to meet any mote device goal or mote network goal could be determined (e.g., computed) by the servicing device 50, individually by the mote device(s) 11, and/or by a distinct (e.g., computer/controller) device monitoring the mote network (each of these devices described with respect to FIG. 1). These examples of goals of mote device(s) as described with respect to mote networks are intended to be illustrative in nature, while not limiting in scope.

Another embodiment of goal for the mote device with respect to the mote network may be to have a prescribed percentage of mote device(s) 11 operable reliably within a mote network for some prescribed duration (e.g., a month). As such, it may be a goal for certain embodiments of the mote device to be able to ascertain how many mote device(s) are operating reliably within the mote network. Another goal may be to ensure that certain data or other information for the mote network is stored in at least one mote device and/or a computer/controller associated with the mote network (and in certain embodiments, have back-up storage capabilities within the mote network).

While many mote device applications pertain to sensing one or more parameters, it is also envisioned that mote device(s) 11 can activate a variety of actuators. For example, in one embodiment, at least one of the mote device(s) 11 can be configured to control an electric current that could be applied to an actuator. The actuator can, in turn, actuate a device such as a light, an actuatable portion of a display, an electronically actuatable device, an electromechanically actuatable device, a computer-based actuatable device, a mechanically actuatable device, etc. As such, another mote device goal with respect to mote networks can include ensuring that certain mote device(s) 11 that can perform actuating operations can perform these operations effectively and/or efficiently.

Power and/or energy can represent a considerable design consideration that would be useful to service and/or control relative to certain embodiments of mote device(s). This disclosure provides a variety of techniques and mechanisms by which power and/or energy levels of at least certain ones of the mote device(s) 11 can be monitored, determined, and/or enhanced. For example, certain mote device(s) require a prescribed power/energy level to perform a particular sensing operation(s), and/or other operation(s). As such, it is important to consider whether one or more mote device(s) across a particular mote network have sufficient power and/or energy levels to perform the particular operation(s). If an energy level or other condition of the mote device(s) varies from a prescribed level, it may be desired in certain embodiments to service the mote device and/or identify those mote device(s) 11 to be serviced.

Certain embodiments of the servicing the mote device(s) can include the servicing device and/or servicing person performing one or more of a variety of servicing actions. The servicing actions can include, but are not limited to: repairing the mote device(s), collecting the mote device(s), transporting the mote device(s) to a remote location, reconfiguring the mote device(s) within a mote network, charging a power supply or battery of the rechargeable mote device(s), destroying the mote device(s), attending to mote device(s) to be serviced, transferring the mote device(s) to a different mote network, and/or repositioning the mote device(s) within the mote network so that they still perform their desired functions and/or operations. As such, within this disclosure, the term "servicing" a mote device can relate to any of these or other similar operations that pertain to a mote device as would be understood by one skilled in the art.

This disclosure can also describe a number of servicing devices 50, as described with respect to FIG. 1. Within this disclosure, the term "servicing device" represents those devices that can actually service, or assist in servicing, those mote device(s) that are to be serviced. Certain embodiments of servicing devices can, for example, travel to where those mote device(s) that are to be serviced are located; and actually collect the mote device(s) 11 to be returned to some location after which they can be repaired, returned to service in the same or a different mote network, etc. Other embodiments of servicing devices, for example, can travel to where the mote device(s) that are to be repaired are recharged or located, and repair or recharge the mote device(s) at that location. Other embodiments of servicing devices identify to a person where the mote device(s) to be serviced, repaired, collected, addressed, reconfigured, recharged, etc. are located, and allow the person to pick up the mote device to perform a suitable operation. Also, for instance, certain embodiments of servicing devices and/or servicing persons can flip over mote device(s) (or in certain embodiments the mote device(s) can flip itself over to be easily detectable by the servicing device or servicing person). Such flipping of those mote device(s) (that appear different on different surfaces) can yield a surface portion of the mote that has a different color, appearance, reflectivity, optical characteristic, etc. Providing the different optical characteristic of the mote device(s) by flipping them can allow those mote device(s) 11 to be more easily identified by a person, or another machine or device to be serviced. As such, servicing devices can be configured in a variety of embodiments to perform a variety of operations relating to servicing mote device(s), identifying, and/or locating mote device(s) to be serviced.

This disclosure thereby provides a variety of techniques and mechanisms by which mote device(s) 11 can be serviced (e.g., by a servicing device, a person, or a distinct entity). Such servicing techniques and/or mechanisms can include, but are not limited to: charging the mote device to increase the power of the mote device (or the mote device's battery); monitoring the energy of the mote device for when it drops below a prescribed level; correcting undesired data conditions of the mote device(s); and/or collecting data from particular mote device(s) 11; etc. For example, when a power level of a particular mote device drops below a prescribed limit, it may be desired to service that particular mote device, and replace or recharge its power source (e.g., a rechargeable battery). These techniques and mechanisms as described in this disclosure are illustrative in nature, and are not intended to be limiting in scope. The identifying to service techniques can be applied to any reason that mote device(s) would have to be serviced.

There may be additional reasons to service a mote device other than the mote device operating outside normal operational parameters, or acting improperly. For example, it may be desired to perform routine servicing on the mote device 11. During certain embodiments of routine servicing it may be desired to service certain embodiments of mote device(s) 11, such as collecting data directly from a mote device (or recharging the mote device) even if the mote device has been operating properly. Such data collection, and similar processes, can be considered an example of routine servicing that may be performed on the mote device. Status indicators (as described in this disclosure, such as are attached to mote device(s) or otherwise associated with a mote device(s)) can include a variety of status indicators that can include: changing in appearance, producing a light, altering a reflective characteristic of a portion thereof, producing a vibration or sound, changing a shape or orientation that can be viewed, etc. Certain embodiments of the status indicator can indicate, in some manner, that the mote device should be serviced (routinely or otherwise) either by a servicing device and/or a person performing servicing. For example, one embodiment of mote device(s) can change color to identify those mote device(s) to be serviced.

As such, certain types of status indicators can be applied to mote device(s) 11 in a manner that allows servicing devices to more readily determine the position of the mote device(s) to be serviced. Certain embodiments of goals for a mote device within the mote network may relate to downloading data to a servicing device and/or other device on a periodic or other basis. For example, a particular mote device may contain data either relating to parameters that the mote device has sensed, or alternatively that another mote device has sensed. It may be desired to achieve some particular mote device(s) "goal" by transferring the sensed data to another mote device; or another device that can process the data, such as a data processing device or a computing device (e.g., a personal computer, a laptop, a microprocessor, a microcomputer, etc.). The device(s) could thereupon distribute data within a mote network as desired.

This disclosure also provides a number of techniques and status indicator mechanisms by which mote device(s) 11 can indicate to servicing devices, other devices, or a person that the mote device should be serviced. For example, in certain embodiments, a surface portion of the mote device can change color in a manner that can be detected by a servicing device or a person who is acting to service the mote network. In other embodiments, the mote device can transmit light having a particular characteristic in a manner that can be detected by the servicing device or a servicing person. In still another embodiment, the mote device can include a status indicator that acts by transmitting a variety of signals such as: a radio signal, an electromagnetic radiation signal, a visible light signal, an infrared or ultra-violet signal, etc. The signal can thereupon be detected by the servicing device or the servicing person. In certain embodiments, the mote device can also change reflectivity to reflect a change in status. In certain embodiments, the mote device can be displaced, such as being flipped over, to expose a surface having a different color, appearance, reflectivity, light-admitting characteristic, etc. if the mote device(s) 11 are to be serviced, and thereby flipping these mote device(s) can act as a status indicator. In yet another embodiment, the mote device(s) to be serviced can output an acoustic signal and/or vibrate in a manner that can be identified to be serviced by the servicing device and/or servicing individual. As such, status indicators can indicate one or more states for a mote device.

Certain embodiments of the status indicator can also include changing a shape, a position, or a conformability of the mote device. For example, the shape of certain embodiments can be changed from substantially flat to oval or round (for example, by filling chambers in the mote device with a fluid or liquid). An oval or round mote device may be easier to locate on a surface such as a roadbed or field than a similarly colored or configured flat device. Other embodiments of status indicators may operate by changing the position of a mote device. Certain embodiments of mote device(s) 11 may be displaced such as performing a "jackknife" between a closed (e.g., hidden) position and an open (e.g., easily-detectable) position, or vice versa. In another embodiment, an extensible flag or other detection segment may extend to make the mote device more easily detectable.

Yet other embodiments of mote device(s) may be configured to adjust their conformability to be more easily detected or identified. For example, certain mote device(s) can be altered between a relatively non-conformable position that is relatively difficult to grab, and a relatively conformable extended position that is more easily grabbed by a person or the servicing device. Certain embodiments of the servicing device can be configured to more easily "grab" easily conformable mote device(s) 11 that should be serviced, and the servicing device can have more difficulty in grabbing the non-conformable mote device(s) that should not be serviced.

Certain embodiments of status indicators can be configured to operate by changing a shape, changing a position, and/or changing a conformation of the mote device. Within this disclosure, changing a conformation of the at least one mote device can make the mote device easily detected or identified by the servicing device, and/or allow the mote device to be more easily "grabbed", attached to, adhered to, etc. by the servicing device. Certain embodiments of the status indicator(s) can thereby be configured as, but are not limited to: a) something that can draw attention to the mote device; b) something that identifies the mote device; and/or c) something that communicates a relevant state from a mote device. Certain embodiments of status indicators can be particularly effective to indicate whether the mote device(s) should be serviced.

As such, one aspect of the present disclosure is to provide mote device(s) 11 that include the status indicator. Certain embodiments of the status indicator can change some characteristic that can be identified by a servicing device, or other device, such that those mote device(s) that should be serviced can be serviced more easily and effectively than without the mote device changing its characteristics. The characteristics of the status indicator for the mote device that may change can include, but are not limited to, appearance, color, light-admitting characteristics, vibration characteristics, acoustic characteristics, etc. The mote device(s) that can be serviced thereby can interact with certain embodiments of servicing devices (or individuals) to identify themselves to the servicing devices as mote device(s) that should be serviced.

Each mote device can be configured to provide one or more of a variety of functions. This disclosure thereby provides various embodiments by which power in an individual mote device(s) 11 can be enhanced as the power drops below a prescribed level. For example, within a mote network, a variety of signals, communications, etc. can be provided between one or more mote device(s) and/or other devices to transfer sensed data, or mote device power information, between the mote device(s) that could be positioned at various locations. Such signals, communications, etc. contain considerable energy. This disclosure provides a number of techniques by which the energy contained within the signals, communications, etc. can be converted into a form that can be utilized to power the mote device, and thereby possibly extend the useful lifetimes and/or operational reliability of the mote device(s) within their respective mote networks.

By ensuring that those mote device(s) 11 within the mote networks that are operating outside normal operational parameters (e.g., are not operating properly or are not configured properly) are replaced, repaired, removed, and/or otherwise serviced; the user of certain embodiments of mote networks can be assured of a more reliable operation of the mote network in general.

II. Examples of Mote Device(s) and/or Technique(s)

The embodiments of mote device(s) 11 as described in this disclosure are intended to be illustrative and enabling in nature, but not limiting in scope. It is envisioned that the concepts, techniques, etc. as described herein with respect to the mote device(s) can also be applied to other embodiments of mote device(s) that would be ascertainable to those skilled in the art. As described in this disclosure, the mote device(s) 11 as described with respect to FIG. 1 may be considered, by their operating within normal operational parameters, as achieving their individual goal(s). When certain one(s) of the mote device(s) are operating outside normal operational parameters (e.g., by running out of power or energy, or storing too much or too little data), those mote device(s) may not be able to achieve their individual goal(s) with respect to the mote network. In certain embodiments, those mote device(s) 11 should thereby either be identified to be serviced, identified (within the mote network) as operating outside normal operational parameters (e.g., operating improperly), and/or being serviced utilizing, e.g., a servicing device and/or a servicing person. It is envisioned that certain mote device(s) 11 within the mote network 10 can transmit data to the mote device(s), as well as perhaps other non-mote device(s). Many embodiments of the mote device(s) 11 can utilize wireless communications (e.g., in certain embodiments of radio frequencies). A variety of wireless communication techniques can be utilized in a variety of networking devices, including but not limited to mote device(s). In general, different embodiments of mote device(s) 11 can be configured to sense a variety of parameters that can include, but are not limited to: temperature, pressure, certain electrical/magnetic characteristics, position, velocity, inertia, presence or absence of individual persons or vehicles, moisture, etc. Such data or information can relate to sensed parameters which can be transmitted (utilizing wireless communication techniques), between one or more mote device(s) 11 and/or one or more computers/controllers 18 as described with respect to FIG. 1.

Each mote device may be configured to perform a variety of controller and/or communication operations utilizing computer and/or networking techniques as described herein. One embodiment of the mote device(s) 11, as configured with respect to FIG. 1, can include a communication portion 13, a sensor/actuator portion 15, a power portion 17, and a controller portion 19. In certain embodiments, the communication portion 13 can be configured to provide communication of signals and/or transfer of sensed data with other mote device(s) 11, the servicing device 50, and/or the computer/controller 18. In one embodiment, the communication portion 13 can include an antenna 12. Certain embodiments of the antenna 12 may be configured to transmit/receive electromagnetic radiation at selected electromagnetic radiation frequencies (that include, but are not limited to: radio frequencies, optical frequencies, infrared frequencies, etc.) to provide a wireless link between mote device(s), computer/controllers 18, etc. Such antennas can thereby provide a transfer of such signals and/or information to other mote device(s) 11, the servicing device 50, and/or the computer/controller 18. In certain embodiments, a user interface that can control one or more operation(s) of the computer/controller 18 can be physically separated from the computer/controller. The computer/controller 18 can also be referred to as a base station. In these embodiments, the user interface can be operationally connected to the computer/controller 18 using wireless, wired-based, and/or other networking data-transfer techniques.

Certain embodiments of the sensor/actuator portion 15 can be configured to sense one or more parameters and/or actuate some device to provide some operability of the mote device 11. A variety of such parameters that can be sensed/actuated are described with respect to the various devices 140, 142, 144, 156, 158, and/or 160, as described with respect to FIGS. 2 and 3. Those parameters to be sensed or actuated, as well as the devices to sense the parameters or actuate the device(s), are intended to be illustrative in nature, and not limiting in scope. It is envisioned that the rate at which each of these individual parameters are sensed or actuated may depend upon the particular configuration of the mote device 11 that can include, but is not limited to: sensed parameters for the mote device, actuation characteristics of the mote device, user input to the mote device, etc. In certain embodiments, the mote sensing/actuating rate can be controlled and/or determined by the computer/controller 18.

Certain embodiments of the controller portion(s) 19 that are located within each one of certain embodiments of the mote device 11 can include, but are not limited to: a processor 605, a memory 607, a circuit 609, and an input/output (I/O) 611. The controller portion 19, as well as its components, can rely on computing architecture and technologies, such as utilized by a microprocessor or microchip. FIG. 1 also illustrates two other devices (the computer/controller 18 and the servicing device 50) that include similarly referenced components: 605, 607, 609, and 611. The devices 11, 18, and 50 are each provided with similar component reference characters 605, 607, 609, and 611 that pertain to computer/controller components that are included in each of the devices 11, 18, or 50, and can rely on similar computer architecture to provide their computer and/or controller technology. For example, each device 11, 18, and 50 can rely on any combination of hardware, software, and/or firmware as is generally understood by those of ordinary skill in the computer and/or controller technologies. As such, certain mote sensing and/or operation processes can be performed by any one of, or any combination of, the devices 11, 18, and/or 50.

Many embodiments of the mote device 11 can be configured to be quite small (e.g., in many embodiments less than several inches, or even less than an inch), and thereby mote device(s) can be distributed in relatively large numbers within an area to be sensed. As such, the mote device(s) can be configured to perform their sensing or operation functionality relatively unobtrusively. Additionally, many embodiments of mote device(s) 11 can be configured to be powered by a relatively low-power device, such as those that may utilize a double-A battery or a power cell. Providing power to many types of mote device(s) 11 in a manner that can ensure a relatively long and reliable operation of certain embodiments of a mote device can be challenging, especially considering many applications of mote device(s). As such, it may be difficult to service power/energy to such mote device(s), or alternatively service such mote device(s) such as by ensuring that they are operating properly, can be properly configured, and can therefore be capable of sensing a variety of parameters or performing a variety of operations. Certain embodiments of the mote device(s) can be located at various difficult to reach locations or dangerous to reach locations such as, but not limited to: an operating automobile or aircraft; within a building, dam, roadway, or a nuclear power plant; at various locations in the human body such as may be desired to access during surgery; underseas at a variety of locations; deep in a forest; or high on a mountain, etc. As such, many embodiments of mote device(s) can, in general, sense a variety of parameters at a variety of locations, and some of the locations may be remote and/or hostile for individuals to access, repair, and/or provide power and/or energy.

Due to the relatively low cost of a variety of certain embodiments of the mote device(s) as compared to other larger and operationally complex sensor and/or actuator devices, it is envisioned that the mote device(s) can be distributed in relatively large numbers to provide a gradient of sensed parameters or provide a variety of operations, or alternatively across a larger area. It is envisioned that as the use of mote device(s) and their associated networks becomes more commonplace, the number of mote device(s) within certain mote networks might become so large that servicing the mote device(s) could provide a challenge. As such, in many embodiments, it may be preferred to simplify performing or "automate" many operations associated with the mote device (s) within the mote networks such as, but not limited to: mote device set-up, mote device operation, mote device servicing, and/or identification of mote device(s) to be serviced, etc. Many of the applications for mote device(s) can demand a relatively high degree of reliability from the power portion and/or it can be exceedingly difficult to service the mote device and/or its power portion 17.

Certain embodiments of the power portion 17, (depending upon their intended use and design), can be configured to provide power to the mote device 11, as well as the communication portion and sensor portions contained therein. In different embodiments, the power portion 17 can be configured as a battery (chargeable and/or disposable), a power supply, and/or a power reception device that can receive power from outside of the mote device. In certain embodiments, the power reception device can convert the power received. For example, a solar panel can be attached to the mote device(s) 11, and the energy received from the solar panel can be converted and used to power the mote device. In an alternate embodiment, energy contained in a received signal can be converted into a frequency and/or a form such that the energy of the signal can be utilized by the mote device(s) 11 to power the mote device(s). These and other operational configurations of the communication portion 13, the sensor/actuator portion 15, and the power portion 17, are provided as illustrated within this disclosure, and are not intended to be limiting in scope. Certain embodiments of mote device(s) can even rely on a passive energy source (e.g., solar panel). As such, it is to be understood that many reasons for servicing mote device(s) may not relate to servicing their power source.

The computer/controller 18 can be configured as a variety of computers and/or controllers to control at least some sensing operations of the mote device(s) 11 (and/or the other devices 18 or 50, as described with respect to FIG. 1), and/or receive, store, or otherwise process at least some sensed output parameters from the mote device(s) 11 and/or the other devices 18 or 50. In different embodiments, the computer/controller 18 can be configured as a standalone computer, a laptop computer, a desktop computer, a microprocessor, a microcomputer, a mainframe computer, and/or any other type of computer that can process data or other information relating to sensed parameters such as provided by the mote device (s) 11 and/or the other devices 18 or 50. The configuration of the computer/controller 18, as described with respect to FIG. 1, is intended to be illustrative in nature and not limiting in scope; more detail relating to the devices 11, 18, and/or 50 are provided in this disclosure.

The positioning of the mote device(s) 11 can be determined by the user, owner, other person, machine, computer, etc. depending upon the particular parameters that are desired to be sensed. In certain embodiments, after the mote device(s) 11 have been positioned, the location of certain techniques can be determined, and the position utilized to provide communications between the particular mote device(s). In certain embodiments, for example, mote device(s) 11 can be distributed within a building, house, or other structure to determine particular sensed parameters with respect to that structure. In certain embodiments, it may be desired to locate other devices 18 or 50 that are associated with the mote device(s) 11 and in operational proximity to the mote device(s) 11 (as described with respect to FIG. 1).

In other embodiments, for example, mote device(s) 11 can be distributed in a variety of configurations including, but not limited to: along roadways or walkways to, in certain cases, determine sensed parameters relating to vehicles or persons travelling thereupon, etc. For example, mote device(s) 11 could be laid upon the ground, a floor, a walkway, etc.; integrated into structures that are laid upon the ground, a floor, a road, a walkway, etc.; or physically embedded within the ground, a floor, a road, or a walkway, etc. In other embodiments, for example, mote device(s) 11 can be distributed across a field, a crop area, in the ground, in a garden, around a family's yard, around a secured business area, within a forest, etc. to sense parameters or perform some functionality with respect to each particular area. Mote device(s) can, in certain embodiments, therefore be utilized to sense a variety of parameters and/or perform a variety of operations as described within this disclosure.

Certain embodiments of this disclosure relate to the use of one or more of the servicing devices 50, as described with respect to FIG. 1. The servicing device 50 can be used to determine those mote device(s) 11 that should be serviced, as well as in certain embodiments physically service one or more mote device(s) 11. In other embodiments, the servicing device can determine those mote device(s) to service, and indicate a position of the mote device for another device and/or a user to service.

Certain mote device(s) may be desired to be serviced for a variety of purposes, and those described herein are intended to be illustrative in nature, but not limiting in scope. The variety of reasons for servicing the mote device(s) can include, but are not limited to: increasing mote device(s) power or battery power, repairing damage to the mote device(s), retrieving certain sensed data or sensed information from the mote device(s), updating sensing operations of the mote device(s), updating other operations of the mote device(s), repositioning of the mote device(s), reconfiguring the mote device(s), and/or repositioning the mote device(s) within an existing mote network, etc.

Figure 7:
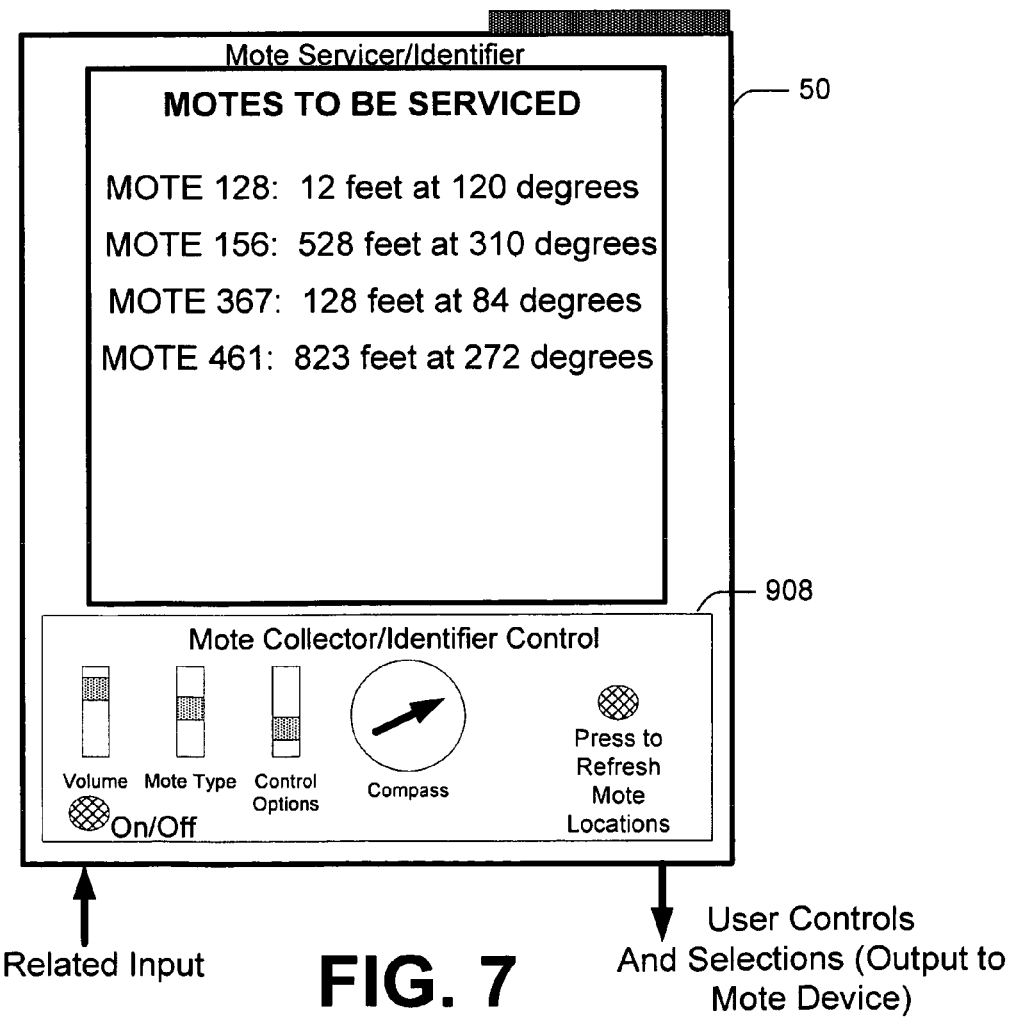
FIG. 7 shows a front view of one embodiment of a servicing device.
Figure 8:
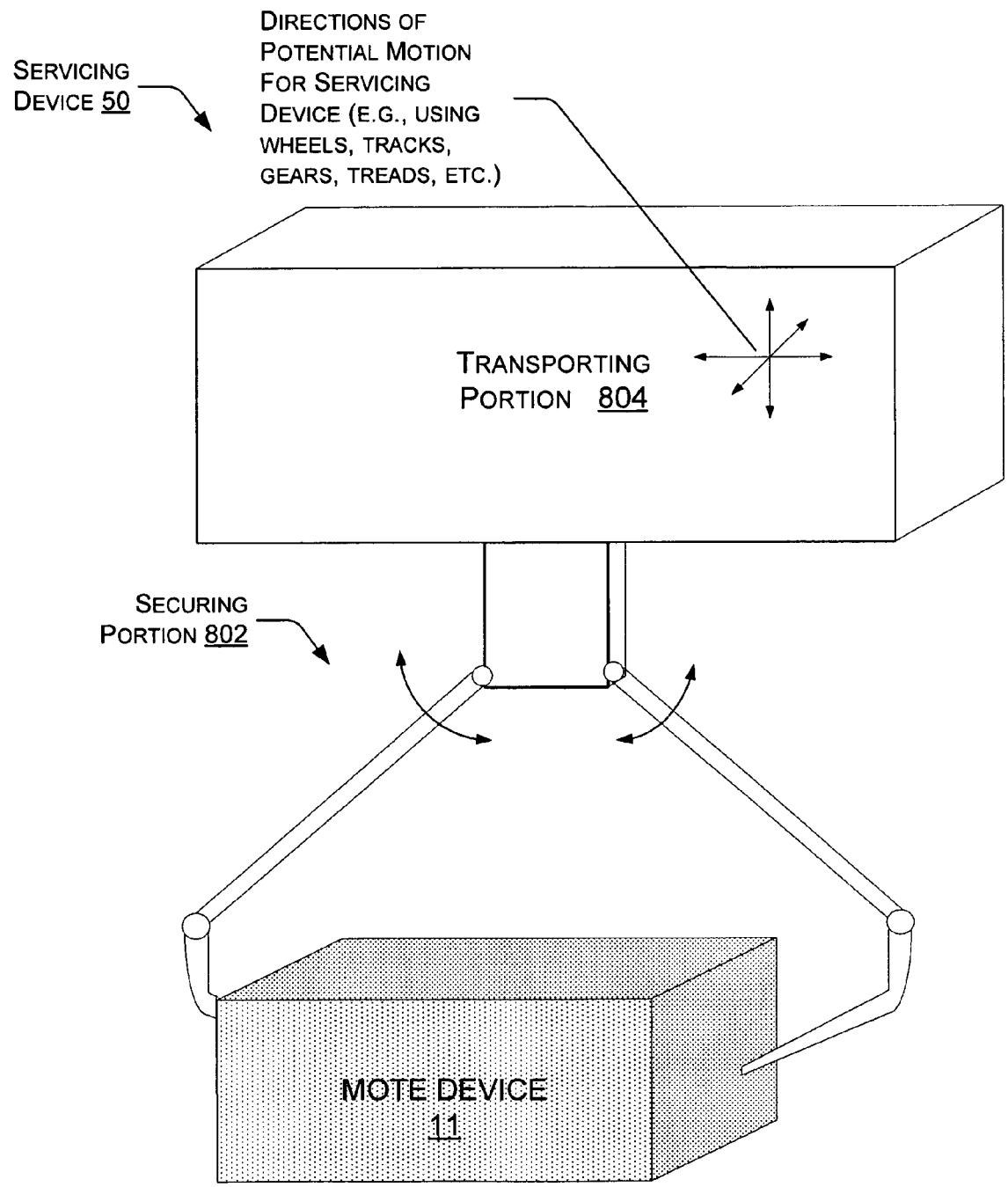
FIG. 8 shows a view of another embodiment of the servicing device.

A variety of techniques are described in this disclosure, in which one or more of the servicing devices 50 can service mote device(s) 11, and certain such techniques are described with respect to FIGS. 7 and 8. One embodiment of a servicing device, as described with respect to FIG. 8, can be largely automated, and can determine a location of one or more mote device(s) that can be used to effectively "pick up" each desired one of the mote device(s). Another embodiment of the servicing device, as described with respect to FIG. 7, can indicate a location (e.g., providing a course to the mote device, as well as a distance) of the mote device(s) to a user, and a human or mechanic "user" can thereupon pick up the mote device (either the user picks up the mote device(s) 11 by themselves, or the servicing device can be utilized by the user to pick up the mote device). In certain embodiments, the servicing device can collect the mote device(s) 11 contained within a prescribed area (in certain embodiments similar in operation to a golf ball collector as used on golf driving-ranges, in other embodiments capable of a patterned or irregular motion to locate the mote device(s)). Upon collecting the mote device(s), the collector can either return all the mote devices for evaluation as to whether they should be serviced; or alternately perform an in-situ evaluation, and return to a remote location those mote device(s) that need servicing while returning those mote device(s) that do not need servicing to the approximate area collected.

Within this disclosure any device that either mechanically, manually, or automatically services (e.g., obtains, collects and/or attends to, discards, replaces, etc.) one or more mote device(s) in some way; or alternatively assists a user (human or mechanical) to physically service one or more mote device(s) in any way can be considered one of the servicing devices 50 as described within this disclosure.

In certain embodiments, the mote device(s) 11 can perform some action, process, etc. to assist the servicing devices 50 in servicing the mote device(s). For example, in certain embodiments, the mote device(s) can change color, texture, emit a sound, provide positional information of the mote device that can be understood by the servicing device, etc. in a manner that can be recognized by the user, the computer/controller 18, and/or the servicing/identifying devices 50 that could ease servicing the mote device. In other embodiments, the mote device can vibrate and/or emit an acoustic signal that can be detected by the servicing device to allow the servicing device to identify the mote device(s) to be serviced and/or attended to.

In other embodiments, the mote device 11 can transmit a servicing signal (e.g., over its antenna 12) that is of some frequency, and can be transmitted over some media such as air, that can be received by the servicing device 50 and/or the computer/controller 18. Such signals contain information that indicate to the servicing device 50 (or a user thereof) that the mote device 11 is ready to be serviced, collected, and/or in some other way attended to.

In certain embodiments, the servicing device 50 can service, collect, and/or attend to one or more of those mote device(s) 11 that are operating outside normal operational parameters (e.g., not operating as desired). For example, those servicing devices that are configured to service and/or attend to those mote device(s) that may have less than some desired parameter limit (such as below a power and/or energy parameter limit) can be configured to perform a suitable servicing operation with respect to the mote device(s). Certain mote device(s) may be incapable of transmitting and/or receiving data as a result of reduced device power or battery power, and it may be desirable to service these mote device(s). It may be desirable to utilize one or more mechanism(s) to the servicing device(s), as described in this disclosure, to allow the servicing device(s) to service one or more mote device(s). These embodiments of servicing devices provide for servicing those motes that are operating outside normal operational parameters (e.g., not operating as desired).

Certain embodiments of servicing devices based on routine maintenance or routine servicing can be configured to service those mote device(s) 11 that have been operating as desired for some prescribed duration, but may require servicing, data transfer, etc. as a result of the operation. This routing servicing can rely on the premise that for servicing of particular mote device(s) within a mote network, each mote device could or should be checked after some duration, regardless of how well the mote device is operating. Such routine servicing can ensure that the mote device(s) continues to perform adequately across the mote network, and thereby continues to meet its operational goals with respect to the mote network.

For example, it might be reasonably expected for certain mote device(s) located at a particular location, and configured to sense one or more particular parameters, to have obtained sufficient data after a particular period of time, such that sufficient data may be located at the mote device to justify servicing that mote device. For example, assume that the amount of data that has or could have been serviced by a particular mote device has reached some prescribed limit; it might be desired to download the data such that it could be saved in another location (and in certain embodiments the data can be discarded) as desired for the particular application and/or situation. Also, it may be desired to analyze data contained in the mote device(s) after sufficient data has been obtained. As such, this disclosure provides a number of mechanisms that allow servicing devices to service mote device(s) 11, such that their data can be serviced.

After (or as an element of) certain embodiments of the mote device(s) have been serviced, the mote device(s) 11 can undergo a variety of additional operations that can include, but are not limited to: being maintained, being returned, being collected, being discarded, being repositioned at the same or different location to continue to operate as desired; being reprogrammed for a different sensing purpose or operation; being not utilized; being attended to; etc. Following these re-alignments and/or reconfigurations of the mote device(s) 11 within the mote network as provided during the servicing, hopefully the mote device(s) that are returned to service can be expected to interact with the remaining mote device(s) within the mote network to perform the intended operations of at least certain collective mote device(s) within the mote networks, and thereby achieve the goals of the collective mote device(s) within the mote network. As such, as described above, the term "servicing" a mote device should be applied to a number of operations (that can be performed by a servicing device or person) such as collecting, repositioning, reconfiguring, attending to, etc. following the locating of the mote device.

Figure 2:
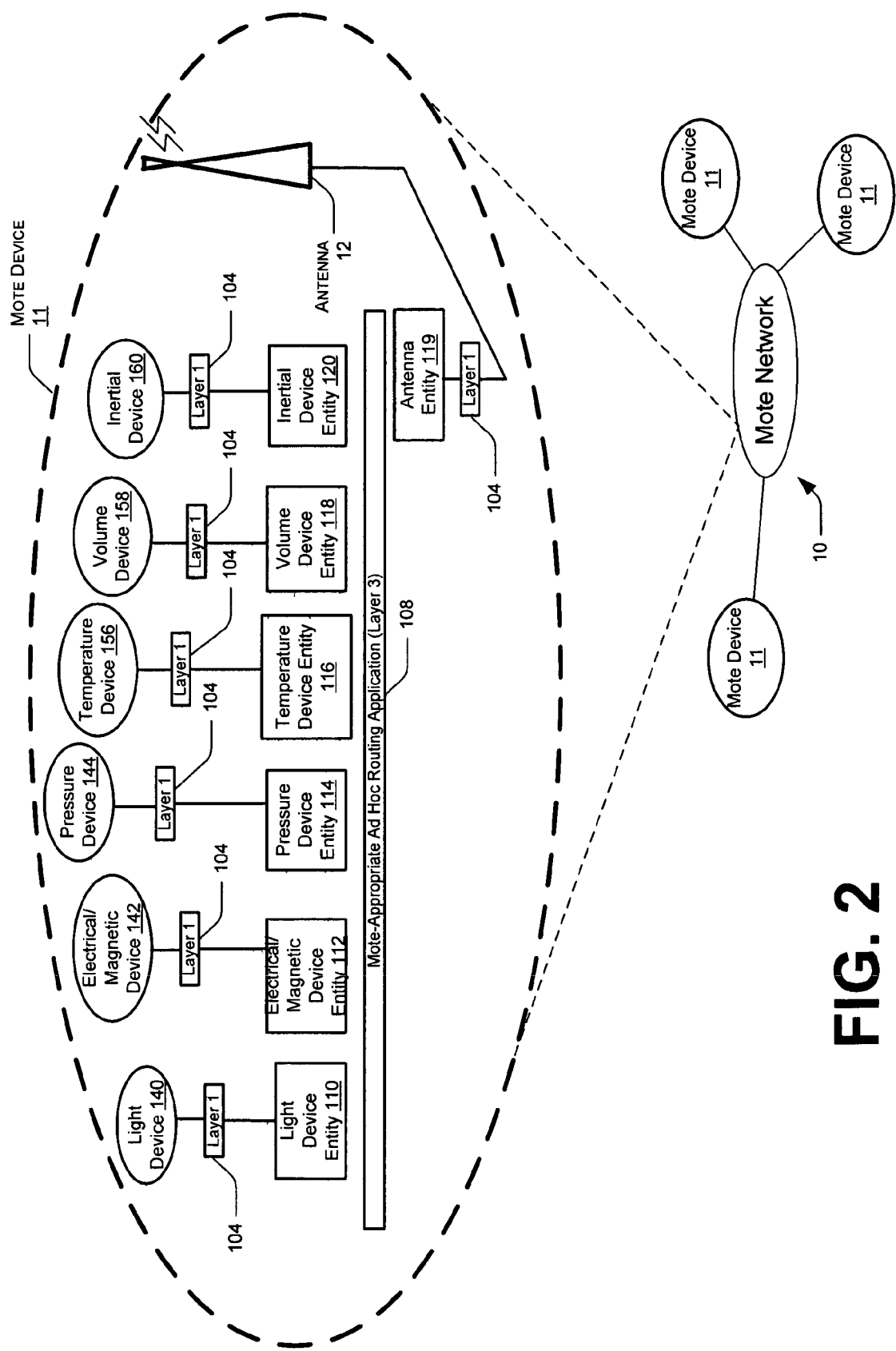
FIG. 2 shows a block diagram of one embodiment of the mote device.
Figure 3:
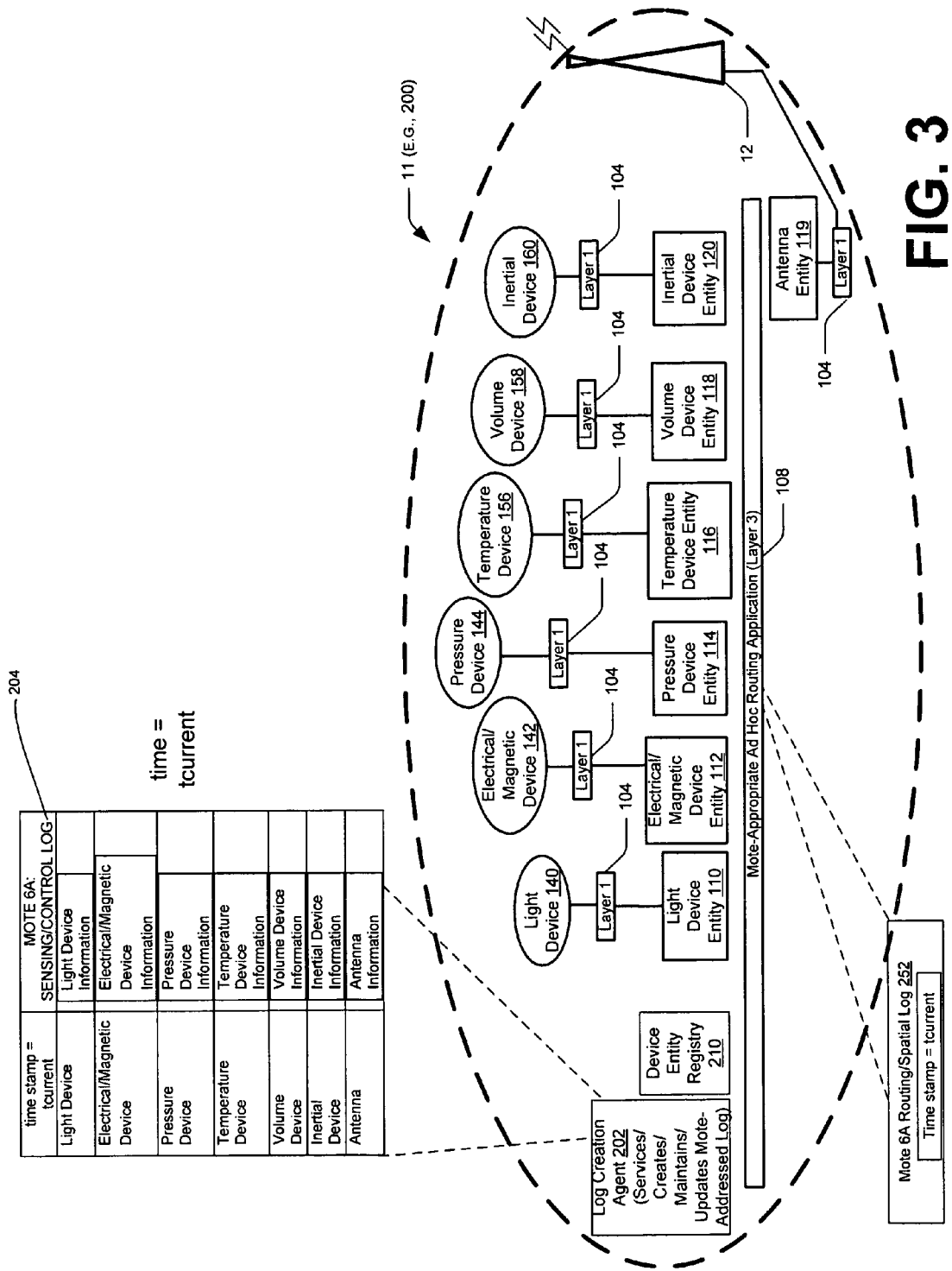
FIG. 3 shows a block diagram of another embodiment of the mote device.

FIGS. 2 and 3 illustrate two illustrative embodiments of the mote device 11. FIG. 2 shows an example of the mote device 11 of the mote-network 10 that may serve as a context for introducing one or more processes and/or devices described herein. These descriptions of the internal components of the mote device 11 are illustrative and enabling, and the concepts and techniques described in this disclosure could be applied to any mote device (or mote) that is not inconsistent with the scope of the description. Mote device(s) can, in general, be configured to be associated with, or include, such additional devices or portions as sensors, actuators, computational entities, and/or communications entities. The mote device 11, as described with respect to FIG. 1, can represent a specific example of a more general mote. The embodiment of the mote device 11 of FIGS. 2 and/or 3 is illustrated as including the antenna 12, physical layer 104, antenna entity 119, network layer 108 (shown for sake of example as a mote-appropriate ad hoc routing application), light device entity 110, electrical/magnetic device entity 112, pressure device entity 114, temperature device entity 116, volume device entity 118, and inertial device entity 120. The particular entities 110, 112, 114, 116, 118, and 120, as well as the other components in these figures, are intended to be illustrative in nature and not limiting in scope. Those entities that are selected can determine those parameters that the mote device can sense, as well as those operations that the mote device(s) can perform. Additionally, the mote device(s) 11 can be configured to provide a variety of operations (e.g., actuating and/or sensing) and/or functions.

Many embodiments of the physical layer 104, as provided within the mote device 11, can provide for data transfer to/from a number of devices (140, 142, 144, 156, 158, and/or 160, etc. as described with respect to FIGS. 2 and/or 3) that allow for sensing a variety of parameters or providing a variety of actuation. Each one of the respective light device entity 110, electrical/magnetic device entity 112, pressure device entity 114, temperature device entity 116, volume device entity 118, antenna entity 119, and inertial device entity 120, as depicted, can couple through physical layers 104 using the respective light device 140, electrical/magnetic device 142, pressure device 144, temperature device 156, volume device 158, antenna 12, and inertial device 160. Those skilled in the art will appreciate that the herein described entities and/or devices are illustrative, and that other entities and/or devices consistent with the teachings herein may be substituted and/or added.

Those skilled in the art will appreciate that herein the term "device," as used for data transmitting applications in the context of the "mote device", or "mote", is intended to represent but is not limited to transmitting devices and/or receiving devices dependent on context. In some exemplary lighting contexts, the light device 140 can be implemented using one or more light transmitters (e.g., coherent light transmission devices or non-coherent light transmission devices) and/or one or more light receivers (e.g., coherent light reception devices or non-coherent light reception devices) and/or one or more supporting devices (e.g., optical filters, hardware, firmware, and/or software). As such, the light device 140 can perform a variety of light operations, upon actuation. In some exemplary implementations, the electrical/magnetic device 142 can be implemented using one or more electrical/magnetic transmitters (e.g., electrical/magnetic transmission devices) and/or one or more electrical/magnetic receivers (e.g., electrical/magnetic reception devices) and/or one or more supporting devices (e.g., electrical/magnetic filters, supporting hardware, firmware, and/or software). In some exemplary implementations, the pressure device 144 can be implemented using one or more pressure transmitters (e.g., pressure transmission devices) and/or one or more pressure receivers (e.g., pressure reception devices) and/or one or more supporting devices (e.g., supporting hardware, firmware, and/or software). In some exemplary implementations, the temperature device 156 can be implemented using one or more temperature transmitters (e.g., temperature transmission devices) and/or one or more temperature receivers (e.g., temperature reception devices) and/or one or more supporting devices (e.g., supporting hardware, firmware, and/or software). In some exemplary implementations, the volume device 158 can be implemented using one or more volume transmitters (e.g., gas/liquid transmission devices) and/or one or more volume receivers (e.g., gas/liquid reception devices) and/or one or more supporting devices (e.g., supporting hardware, firmware, and/or software).

Certain embodiments of mote device(s) 11 can also be configured to display images, similar to those displays, screens, etc. that can be used as computer monitors, televisions, theaters, signs, billboards, personal display assistants (PDAs), etc. In certain embodiments of mote device(s), each mote device can actuate one or more colors (in certain instances, all the colors) for one or more picture elements (pixels) for the display. In certain embodiments of mote device(s), the color levels can be adjusted by the mote device depending upon the resolution, or quality, of the display. As such, certain embodiments of the mote device(s) can act as an actuator for a display.

In some exemplary implementations, the inertial device 160 can be implemented using one or more inertial transmitters (e.g., inertial force transmission devices) and/or one or more inertial receivers (e.g., inertial force reception devices) and/or one or more supporting devices (e.g., supporting hardware, firmware, and/or software). Those skilled in the art will recognize that although a quasi-stack architecture can be utilized herein for clarity of presentation, other architectures may be substituted in light of the teachings herein. In addition, although not expressly shown, those having skill in the art will appreciate that entities and/or functions associated with concepts underlying Open System Interconnection (OSI) layer 2 (data link layers) and OSI layers 4-6 (transport-presentation layers) are present and active to allow/provide communications consistent with the teachings herein. Those having skill in the art will appreciate that these layers are not expressly shown/described herein for sake of clarity, and are not intended to be limiting in scope.

Many embodiments of mote device(s) 11 are configured to sense a number of sensed parameters. For example, the mote device 11, as illustrated in FIGS. 2 and 3, can be configured to sense light, electrical/magnetic level, pressure, temperature, volume, and/or inertia. These particular parameters as described with respect to FIGS. 2 and/or 3, or throughout this disclosure, are intended to be illustrative in nature and not limiting in scope. Sensors for mote device(s) can be configured to sense a wide variety of parameters or actuate a wide range of device(s). Certain embodiments of mote device(s) 11 can be configured during device configurations (e.g., by the mote device designer and/or user) to sense particular prescribed parameters, and that mote device will sense only those prescribed parameters during its intended lifetime. By comparison, certain embodiments of mote device(s) 11 can be reconfigured during normal operation to sense different prescribed parameters. During configuration and/or reconfiguration, certain embodiments of mote device(s) 11 can be connected to or modified to a particular sensing device, such as providing a new hardware, software, firmware, etc. During reconfiguration, other embodiments of mote device(s) 11 can be reconfigured such that certain sensing devices that had previously been integrated in, or associated with, the mote device(s) can be actuated, such as by reconfiguring the hardware, software, firmware, etc.

FIG. 3, depicts an exploded view of an embodiment of the mote device 200 (that represents one example of the mote device 11, as described herein with respect to FIG. 1). The mote device 200 can form a part of a mote-appropriate network. The mote device 200 as described with respect to FIG. 3 is illustrated as similar to mote device 11 (e.g., described with respect to FIG. 2), but with the addition of log creation agent 202, mote-addressed sensing/control log 204, and mote-addressed routing/spatial log 252.

One embodiment of a mote-addressed sensing/control log 204, as described with respect to FIG. 3, can be configured to sense particular illustrative but non-limiting parameters of: entries of light device information, electrical/magnetic device information, pressure device information, temperature device information, volume device information, inertial device information, and antenna information. Examples of light device information can include measures or productions or light based on brightness, saturation, intensity, color, hue, power (e.g., watts), flux (e.g., lumens), irradiance (e.g., Watts/$cm^2$), illuminance (lumens/$m^2$, lumens/$ft^2$), pixel information (e.g., numbers of pixels (e.g., a very small mote image capture device), relative pixel orientation)), etc. Examples of electrical/magnetic device information can include measures of field strength, flux, current, voltage, etc. Examples of pressure device information include measures of gas pressure, fluid pressure, radiation pressure, mechanical pressure, etc. Examples of temperature device information include measures of temperature such as Kelvin, Centigrade, and Fahrenheit, etc. Examples of inertial device information include measures of force, measures of acceleration, deceleration, etc. Examples of antenna information include measures of signal power, antenna element position, relative phase orientations of antenna elements, delay line configurations of antenna elements, beam directions, field of regard directions, antenna types (e.g., horn, biconical, array, Yagi, log-periodic, etc.), etc.

In the implementation, as described with respect to FIG. 3, a log creation agent 202 can utilize a computer program that can be resident in the mote device 200, that executes on a processor of mote device 200 and that constructs and/or stores mote-addressed sensing/control log 204, and/or mote-addressed routing/spatial log 252 in the memory of mote device 200. In some implementations, log creation agent 202 is pre-installed on mote device 200 prior to mote device 200 being added to a mote-appropriate network, while in other implementations log creation agent 202 crawls and/or is transmitted to mote device 200 from another location (e.g., a log creation agent at another mote or another networked computer (not shown) to thereby replicate or clone itself, and transmits that log clone to mote device 200). In yet other implementations, the log creation agent 202 can be installed at a proxy (not shown) for mote device 200. Such logs can be accessed, with certain embodiments of the servicing devices, to determine whether the individual mote device(s) are achieving their goals as per the mote network.

The structure and operation of each mote device 200 or 11, as described with respect to FIGS. 1, 2, and/or 3, are intended to be illustrative in nature and represents a number of illustrative embodiments of mote device structure and operation. Mote device(s) continue to undergo development, and it is to be understood that other mote structures and operations (such as is described in the articles, publications, and research as described herein) are also intended to be within the scope of the present disclosure as long as such mote structures and operations satisfy the claim limitations of the present application, as interpreted based on the present disclosure.

In certain embodiments of this disclosure, the systems and/or processes transfer their instructions in a piecewise fashion over time. In some applications, motes can be considered as relatively low-power and/or low bandwidth devices, and thus in some implementations the system(s) and process(es) described herein allow many minutes (e.g., hours, days, or even weeks) for herein described agents and/or processes to migrate to and establish themselves at various motes. The same can be true for transmission of information among motes in that in some implementations such transmission may be done over the course of hours, days, or even weeks depending upon bandwidth, power, and/or other constraints. In other implementations, the migrations and/or transmissions are accomplished more rapidly, and in some cases may be accomplished as rapidly as possible.

III. Examples of Interaction Between Mote Device(s) and Servicing Device(s)

In certain embodiments, a mechanism that can include the status indicator portion can change some condition or position of the mote device 11 that can be detected by the servicing device. Such a detectable change to the mote device 11 could be detected by many embodiments of the servicing device such as a change in color of the mote device when the mote device is indicating that it should be serviced. For example, a power-sensing servicing device can sense a power level of certain mote device(s). In certain embodiments, the status indicators can be formed as, or attached to, a portion or the entirety of an external surface of one or more mote device (s) 11.

Figure 4:
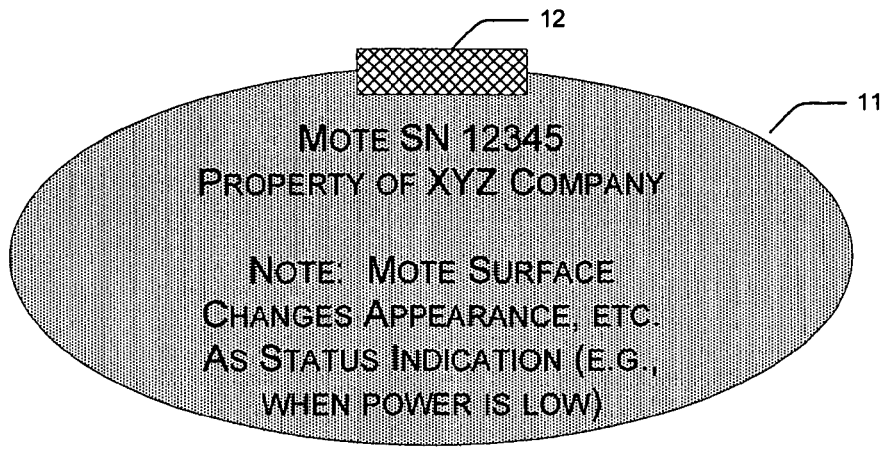
FIG. 4 shows a view of one embodiment of the mote device.
Figure 5:
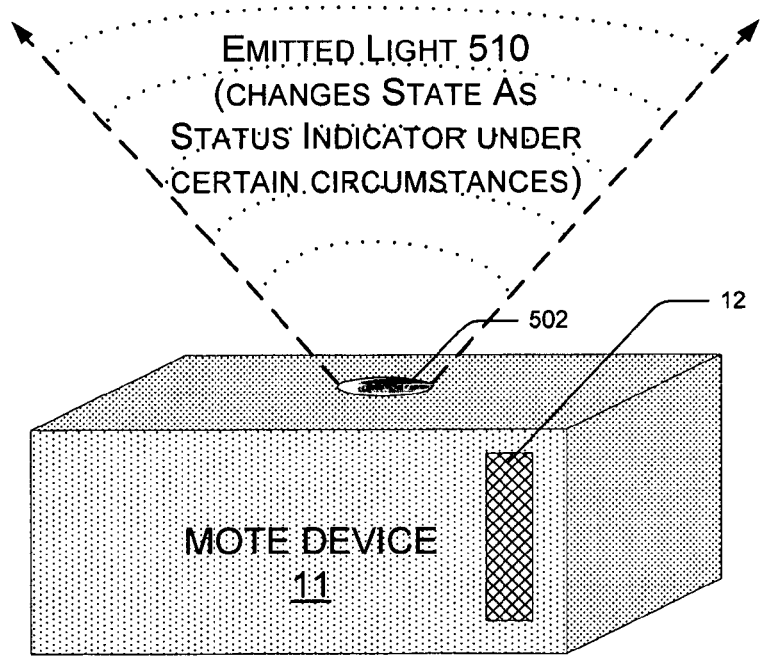
FIG. 5 shows a view of another embodiment of the mote device.
Figure 6:
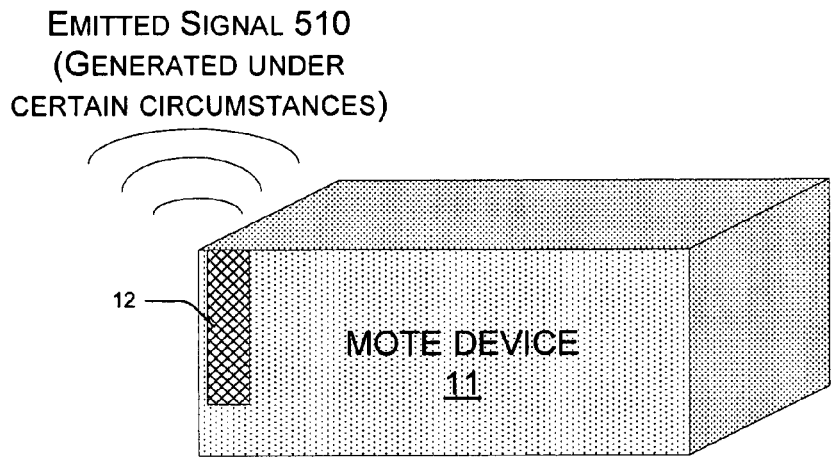
FIG. 6 shows a view of yet another embodiment of the mote device.

There are a variety of techniques by which the mote device 11 can indicate to other devices (e.g., a servicing device) that the mote device 11 can be, or is configured to be, serviced, identified to be serviced, and/or attended to. The particular shape or surface configuration of the mote device(s) 11 (and the associated antenna to the mote device(s)) as illustrated in FIGS. 4-6 are intended to be illustrative in nature, and not limiting in scope. Certain embodiments of mote device(s) can be formed in a desired and/or suitable shape and configuration. The embodiment of the mote device 11, as described with respect to FIG. 4, can be configured such that at least one of its surfaces changes some status indicator as described herein to identify to a servicing person or servicing device when it should be serviced. In one embodiment of the mote device 11 as described with respect to FIG. 4, the color, light emitted, reflectivity, or signal generated changes when some event associated with servicing occurs such as, for example, the power supply of the mote device drops below a prescribed power level. Such change in the status indicator of the mote device can be used by a person or a mechanism to recognize those mote device(s) that should be serviced.

As such, causing the status indicators (that can, in certain embodiments, be configured as tags) to change color using some chemical, fluorescent, phosphorescent, mechanical, or other technique, can effectively result in changing the outward appearance of certain embodiments of the mote device. One example of a mechanical change in color on the mote device(s) may include, but is not limited to, physically "pumping" some liquid into a chamber of the mote device that is visible from the outside of the mote device.

Another example of a status indicator that can be implemented utilizing a change in color may include painting or otherwise coloring two surfaces of the mote device(s) 11 in two colors. As such, during normal operation, one color of the mote that is typically facing upwards will be colored or painted a first color. As particular mote device(s) are identified as those to be serviced, those mote device(s) can be displaced such as being "flipped over" using, e.g., a displacement portion of the servicing devices, an identifying device, or even a positional actuator located within the mote device itself. After the mote device(s) is displaced such as by being flipped over, the newly exposed surface(s) can be of a different color, reflectivity, etc. and can thereupon be identified by the servicing device and/or an individual. As such, certain embodiments of mote device(s) could vibrate, click, buzz, provide a voice signal, provide a signal of some frequency that may or may not be audible by human ears but might be to the servicing device or controller, provide a light signal, change color, change shape and/or position of the mote device (s) to be serviced, etc. Such change of an outward appearance of certain embodiments of the mote device can be detected by a human, or alternatively a mechanism that can sense color, vibration, reflectance, or the particular characteristic being identified by the servicing device or individual. In certain embodiments, image processing and/or filtering techniques can be used to identify locations of mote device(s), or the status indicator attached thereto, that have changed color. In certain embodiments, the servicing device can be configured to automatically recognize those colors of the mote device(s) that indicate that the mote device(s) should be serviced. For example, consider in one embodiment, the mote device turns to a particular color when it's power and/or energy level is low, and perhaps to another color when data-storage or transfer becomes an issue.

As such, it may be beneficial for the servicing device to be capable of recognizing mote device(s) 11 having a particular color and thereupon may indicate that the mote device should be serviced. In certain embodiments, a filtering device can be used by a servicing device to monitor an area that mote device(s) are located for a particular color that would indicate that the mote device should be serviced (e.g., collected, reconfigured, replaced, destroyed, discarded, etc. as described herein). When that particular color is received by the servicing device, then the servicing device can identify that particular mote device to a person or mechanism that can service the mote device, or alternatively service the mote device itself. This scenario represents an illustration of one embodiment of the servicing device or mechanism that can be used to service at least one mote device(s), while it is to be understood that other embodiments of servicing devices can also be utilized that also rely upon the appearance, reflectivity, color, shape, etc. of one or more surfaces of the mote device(s).

A number of embodiments of status indicators can be utilized to change the color of a surface of one or more mote device(s) 11, as described with respect to FIG. 4. Certain embodiments of status indicators can include, but are not limited to: a chemical status indicator or a fluorescent status indicator, which can be utilized to change color of a surface upon a prescribed condition. The structure and operation of a chemical status indicator and/or fluorescent status indicator are generally understood, and will not be described in further detail herein. Certain embodiments of mote device(s) can change color, reflectivity, shape, etc. from their natural background (e.g., green for mote device(s) located in or on a grassy field, or gray or black for mote device(s) located in or on a roadway) to an easily-detectable color (e.g., orange for mote device(s) in a field) to ease servicing by a person or optical-based servicing device.

Other embodiments of the mote device 11 can be configured to emit light of a recognizable color, brightness, blinking rate, etc. when it is desired that the mote be serviced by, for example, the servicing device 50. As such, the emitted light can be utilized (for example by a person or the servicing device 50) to identify the location or presence of one or more mote device(s) based, at least in part, on the appearance of the at least one mote device(s). In one embodiment, a light emitting diode (e.g., LED) or display device that can be actuated based on a parameter sensing, for example, that the mote device has relatively low-power. As such, the mote device 11 can be configured to emit a particular color if it is desired that mote device, for example, be serviced by the servicing device based, at least in part, on the color of the mote device. In certain embodiments, for example as described with respect to FIG. 5, the mote device 11 includes a light source 502, that can be configured to generate light of a desired color, blink at a desired rate, or to provide another desired optical characteristic, etc. when it is desired to have the mote serviced or attended to. In certain embodiments, the light device 502 can include at least one light emitting diode(s) which has been designed to provide a signal 510 that can, in this embodiment, include a detectable amount of light that preferably utilizes relatively little power. As such, the servicing device, a servicing person, or alternatively a user of the servicing device should be able to recognize and/or locate those mote device(s) 11 that are to be serviced based on the signal 510 that includes light from the light source 502. As such, the light emitted from the light source 502 can be selected to indicate one or more conditions of the mote device 11. In certain embodiments, the light source 502 can be a relatively low-powered device, such that the mote device 11 will be able to emit a light even under certain circumstances that the mote device has insufficient power to operate properly.

A variety of techniques may be utilized to approve the servicing or attending to of mote device(s) 11 that are of a particular color or are emitting light. For example, if a user is monitoring mote device(s) within an interior space such as a building, then it may be desired to turn out other lights within the room, building, outdoor area, etc. where the mote device is located to determine which ones of the mote device(s) are generating light from the light source 502. Alternatively, light of a particular frequency may be generated from the light source, that is not a similar frequency to the light in the area around the mote device 11. For example, the light source 502 can be configured to emit infrared or ultraviolet light; and a suitable filter can thereupon be used by the servicing device to filter out light that does not correspond to that emitted by the light source 502. As such, the ambient light of the region (that differs in frequency or color from the light of the light source 502) does not hide the location of the light source and mote device, and thereupon the location(s) of the light source(s) and mote device(s) can be readily detected. In certain embodiments, light of a different frequency than provided by the light source 502 can be filtered out to allow a user, or a detecting portion associated with the servicing device, to determine whether one or more of the light sources from the mote device(s) 11 are emitting light of that particular frequency. Such filtering techniques can be utilized by a person or imaging portion of the servicing device to improve locating and/or identifying such mote device(s) that should be serviced.

Some implementations shown/described herein include various separate architectural components. Those skilled in the art will appreciate that the separate architectural components are so described for sake of clarity, and are not intended to be limiting. Those skilled in the art will appreciate the herein-described architectural components, such reporting entities, logs, and/or device entities, etc. are representative of substantially any architectural components that perform in a similar manner. For example, while some implementations show reporting entities obtaining information from logs created with device entity data, those skilled in the art will appreciate that such implementations are representative of reporting entities obtaining the data directly from the device entities. As another example, while some implementations show reporting entities obtaining information produced by device entities, those skilled in the art will appreciate that such implementations are representative of executing sensing of parameters, or some other operation, at the mote device 11 or 200. In certain embodiments, the mote device(s) 11 or 200 can extract and/or transmit similar information as that described in the relation to the reporting entities and/or device entities. For example, some multi-mote log creation agent making a query of a database entity resident at the mote device(s) within the mote network, where the database entity would perform in a fashion similar to that described in relation to reporting entities, logs, and/or device entities, etc. Thus, those skilled in the art will appreciate that the architectural components described herein are representative of virtually any grouping of architectural components that perform in a similar manner.

As described with respect to FIG. 6, certain embodiments of mote device(s) 11 can provide a status indicator as described herein by generating a signal (optical, acoustic, vibration, or other) using the antenna 12 or other suitable portion of the mote device. In certain embodiments, the signal 510 can thereby act as a status indicator by indicating the mote device should be serviced by the servicing device 50 for any of the reasons described in this disclosure. For example, perhaps the signal being generated by the mote device is reaching a relatively low energy and/or power state, and could be serviced to be recharged and/or replaced. In another embodiment, perhaps the memory storage capabilities of the mote device is reaching its filled state.

This disclosure provides certain embodiments of the servicing device 50, as described with respect to the FIG. 1. FIGS. 7 and 8 show two embodiments of servicing devices 50. Certain embodiments of the servicing device 50 are designed to service either those mote device(s) that are suitable to be serviced as determined by the servicing device (or a user thereof), or alternatively the mote device indicates to the servicing device that the mote device should be serviced. The embodiment of the servicing device 50 as described with respect to FIG. 7 includes a mote collector/identifier control 908 and is intended to be used by an individual, and identified to the individual identities and/or locations of the mote device(s) 11 that are to be captured. The embodiment of the servicing device 50 as described with respect to FIG. 8 is intended to be programmed to automatically service those mote device(s) 11 that are to be serviced. Consider that one embodiment of the servicing device 50, as described with respect to FIG. 8, can contain a securing portion 802 and a transporting portion 804. The securing portion 802 can be configured to somehow retain, grab, hold, adhere to, or somehow otherwise secure the mote device during transport of the mote device. The transporting portion 804 can be configured to transport the mote device 11 to a desired location, such as to a recharge location, to a repair/replacement base, to a computer/controller 18 as described above to transfer at least some of its data, or to a discard location. The particular configuration of the securing portion 802 and the transporting portion 804, as illustrated in and described with respect to FIG. 8, are intended to be illustrative in nature and not limiting in scope. The servicing device(s) 50, as described with respect to FIGS. 7 and 8, are intended be illustrative in nature, and not limiting in scope.

Figure 9:
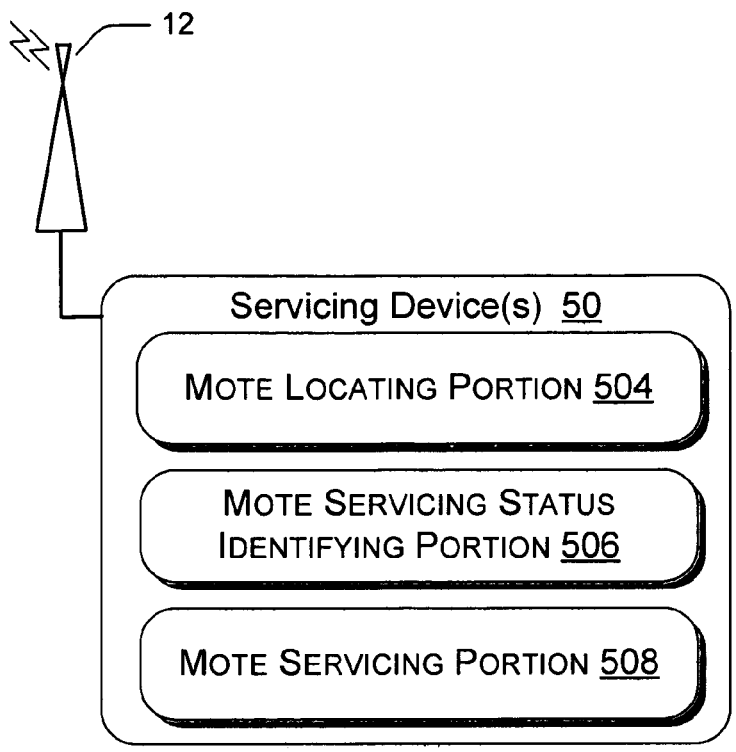
FIG. 9 shows a block diagram of one embodiment of the servicing device.

The embodiment of the servicing device 50 as described with respect to FIG. 9, represents one generalized embodiment of the servicing device that determines those mote device(s) 11 that are to be serviced. The embodiment of servicing device 50, as described with respect to FIG. 9, can include, but is not limited to: a mote locating portion 504, a mote servicing status identifying portion 506, and mote servicing portion 508.

Certain embodiments of the mote locating portion 504, as described with respect to FIG. 9, can be configured to locate one or more mote device(s) such as, but not limited to, providing the exact geographic position of each mote device to be serviced as could be understood by the servicing device(s) 50. In certain embodiments, the mote locating portion can be utilized to indicate positions of those at least one mote(s) to be serviced. Other embodiments of the mote locating portion 504 can be configured to provide a relative geographic position of each mote device to be serviced with respect to the servicing device 50 in a manner the can be understood by the servicing device. As such, many embodiments of the mote locating portion 504 can utilize positional information, such as provided by global positioning systems (GPS, many of which are commercially available), RNAV, very-high-frequency omni-directional range (VOR), radio locating/ranging, or other positioning devices. In other embodiments, the mote locating portion 504 can define locations of motes with respect to some other coordinate axis. For example, a mote locating portion 504 that deals with mote device(s) 11 located within an automobile engine or an interior of a power plant could rely upon some coordinate axis defined with respect to that automobile engine or interior of the power plant. Additionally, a mote locating portion 504 that services mote device(s) that are located within a room can establish coordinates with respect to that room. As such, the selection of a particular coordinate axis by which the mote locating portion 504 operates may depend largely upon the location of the mote device(s) themselves, and a user of the mote device(s) could determine a convenient coordinates axis depending upon the location of the mote device(s) to be serviced. As such, certain embodiments of status indicators can integrate positional information of the mote device(s) to assist in locating the mote device(s). These examples of status indicators including positional information sources are not intended to be limiting in scope.

Certain embodiments of the mote servicing status identifying portion 506 can identify those mote device(s) 11 that are intended be serviced. By comparison, the mote servicing portion 508 can be configured to service those motes identified by the mote servicing status identifying portion 506. In certain embodiments, similar to as described with respect to FIG. 7, the identification performed by the mote servicing status identifying portion 506 can be performed by an individual with the servicing device 50 (in one embodiment by following directions as to have the servicing device locate each mote device to be serviced). Thereupon, as the user reaches each mote device to be serviced in order, the user can physically pick up each mote device. As such, in many embodiments, the servicing devices 50 can be manually configured such that the servicing devices indicate the location of the mote device(s) to be serviced, and a user who is associated with the servicing device manually picks up those mote device(s).

In certain embodiments, similar to those described with respect to FIG. 8, the operations of the servicing device, or a mote servicing portion, can be largely automated. Using such automation techniques, identification of the location of each mote be serviced (as provided by the mote servicing status identifying portion 506), and can be input to the mote servicing portion 508. As such, the mote servicing portion 508 can rely upon a variety of automated techniques (e.g., such as noted to be understood to those skilled in the robotics arts), to service those particular mote device(s) 11 that are to be serviced. For example, certain embodiments of the mote servicing portion 508 of the servicing device 50 can include an automated or manual grasping mechanism, an automated or manual shoveling mechanism, an automated or manual grabbing mechanism, an automated or manual holding mechanism, or some other type of automated or manual mechanism by which the mote device can be held in position by the servicing device 50. In certain embodiments, the servicing device can then transport the mote device to a desired location. Certain embodiments of the mote servicing portion 508 of the servicing device 50 can utilize some type of transport mechanism, such as, but not limited to: wheels, tracks, treads, steppers, skids, sleds, etc. or other further techniques by which the servicing device 50 can be transported across the type of area from which the particular mote device 11 is being serviced.

Certain embodiments of the servicing device could be operationally "directed" at those mote device(s) 11 that could be serviced using, for example: optical sensed color that could be output by the mote device(s) 11 (e.g., as described with respect to FIGS. 4 or 5), positional information and/or servicing information that could be provided by the mote device(s), an audio, light, or other signal that could be output by the mote device(s) and thereupon detected by the servicing device, and/or any other type of signal or indicator (e.g., a status indicator) that could indicate the mote device is ready to be serviced and/or where to locate that mote device to be serviced. Other embodiments of the servicing device 50 could propel themselves (in a random or organized fashion that can be automated or manual) around an area where mote device(s) are located, until they come in contact with those mote device(s) that are to be serviced.

There are a variety of techniques by which the servicing device 50, as described with respect to FIG. 1, can service one or more of the mote device(s) 11. One embodiment of servicing device 50 can be associated with an individual, and can assist to indicate to the servicing device or servicing person a particular location of the mote device. In one embodiment, for example, the servicing device 50 can indicate a reference distance and a reference angle to any mote device, or alternatively a particular mote device. For example, a mote device 11 to be serviced can be 20 feet away from the servicing device at an angle of 120° (or any other suitable distance and/or angle or similar coordinate system). Certain embodiments of the servicing device 50 can utilize ranging techniques, similar to those techniques developed for such positioning applications such as radar and global positioning systems, many of which are commercially available and will not be further described herein.

Certain embodiments of the servicing device 50 can then propel itself, or be propelled or carried by a user, to the servicing device, and service the mote device using a suitable mechanism. Certain embodiments of the servicing devices 50 could repair, reconfigure, repower, discard, or apply energy to recharge the mote device (perhaps with the assistance of a person), and even perhaps return the mote device to its original location after performing its work at the location of the mote. Certain automated embodiments of the servicing devices 50 could return one or more serviced mote device(s) 11 to another location to work on or repower the mote device(s). Certain embodiments of servicing devices could return the repaired mote device(s) to the same location, or alternatively reconfigure the mote device to operate at a different location, with a different configuration within the mote network, and/or within a different mote network. Alternatively, certain embodiments of mote device(s) can be designed to configure themselves (automatically or otherwise) where they are located utilizing self-configuring techniques. These servicing techniques and scenarios by different embodiments of the servicing device 50 are intended to display the vast variety or scenarios by which mote device(s) can be serviced for a variety of purposes, and is not intended to be limiting in scope. As such, many embodiments of the servicing device 50 (e.g., automated, to be used by a person, and/or other configurations of servicing devices such as described herein) can perform a variety of servicing techniques.

IV. Examples of Signal Energy Transfer to Mote Device(s)

Certain embodiments of the mote device 11, as described with respect to the FIGS. 1 to 3, can rely on power or energy level for a variety of reasons including, but not limited to, extending useful device life for the mote device(s), enhancing reliability of the mote device(s), etc. This disclosure provides a variety of techniques by which the power/energy level of the mote device can be extended using energy contained within a signal 1005 provided by the servicing device 50, or some other device. In certain embodiments, the signal 1005 can provide for querying, controlling, responding to, signaling, and/or a variety of other operations of the mote device(s) 11 within the mote network. The signal 1005, however, contains some amount of energy that (perhaps when converted to a desired frequency) would be useful for the mote device(s).

Figure 10:
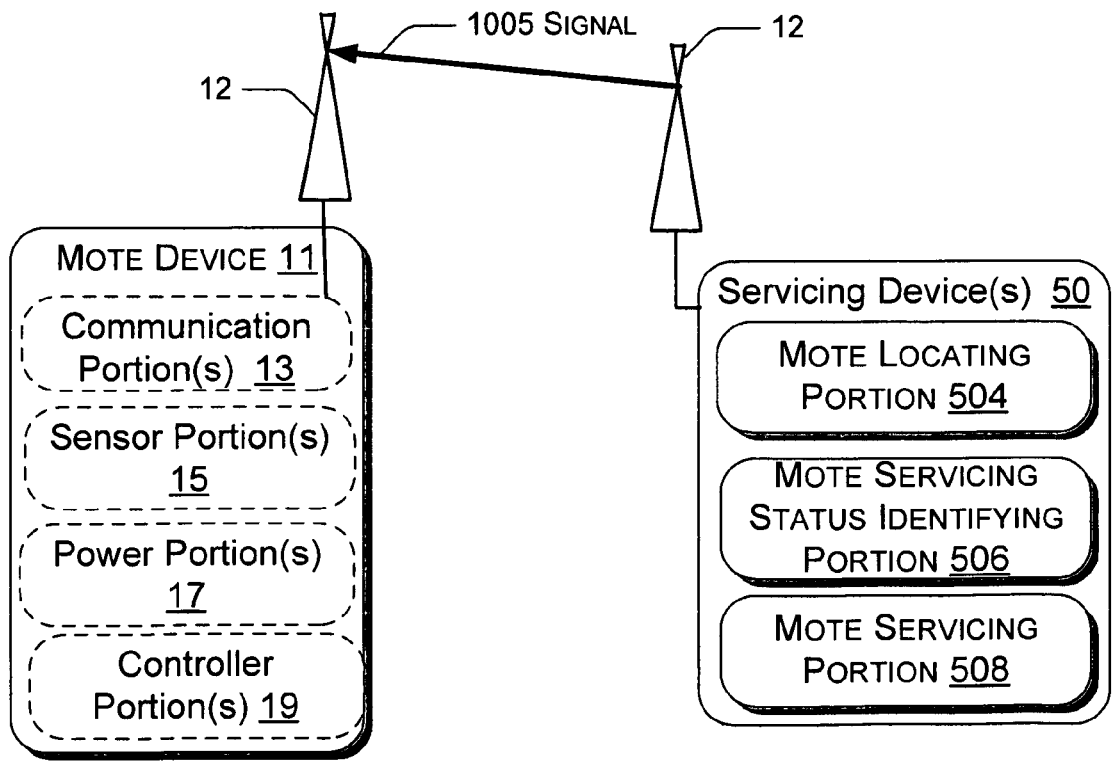
FIG. 10 shows a block diagram of one embodiment of the servicing device and mote device.

FIG. 10 illustrates one embodiment of the servicing device 50, that is providing a signal 1005 that can to be received by the mote device 11. As described in this disclosure, many embodiments of mote device(s) 11 can include a power portion 17, which can in certain embodiments include, for example, a battery such as a double-A battery, a power cell, etc. In certain embodiments, the power portion 17 can be rechargeable. Increasing the charge of the rechargeable power portion 17 can thereupon increase the energy level, an effective device life, and longevity in certain embodiments of the mote device 11, especially when the energy level of the mote device 11 is low. As such, this disclosure provides a mechanism by which energy contained within the applied signal 1005 can be utilized to recharge the power portion 17, if the power portion is rechargeable.

In certain embodiments of the mote device 11, the communication portion 13 is to be configured to convert a frequency of the received signal 1005. As such, even if the signal 1005 is not of a frequency (e.g., of electromagnetic radiation) that can be utilized by the power portion to charge the undercharged power portion 17, the communication portion 13, (or an associated portion), can thereupon convert the frequency of the electromagnetic radiation to a frequency that can be used to charge the power portion 17. By increasing the charge of the mote device(s) 11, the effective life of certain embodiments of mote device(s) can be extended. Under certain scenarios, the servicing device 50 can be scheduled to routinely consider some, many, or all of the mote device(s) 11 in a mote network for servicing, collection, attending to, etc., and the energy from the signal 1005 can effectively recharge, to some degree, at least some of the mote device(s) that are configured to be recharged. As such, it is to be understood that this disclosure provides a number of techniques by which signals 1005, as applied from the servicing device 50, can be utilized to increase the energy or power level of an undercharged mote device 11. While FIG. 10 illustrates the servicing device 50 generating the signal 1005, it is to be understood that such signals 1005 can be provided by a wide variety of devices including, but not limited to: the servicing device 50, the computer/controller 18, another mote device 11, or any other device that can be configured to produce a signal (that can be converted to utilize the signal's energy).

It may be desired to utilize the signal 1005 to be produced by the servicing device 50, and the servicing device 50 can utilize the mote servicing status identifying portion 506 to determine a status of the mote device 11. Particularly, as described with respect to FIG. 9, whether the mote device 11 is undercharged can be one status item of the mote device 11 that can be determined by the mote servicing status identifying portion 506 of the servicing device 50. As such, the servicing device 50 can be provided with a number of options if it is determined that there is one or more undercharged mote device(s) 11. In one embodiment, the servicing device 50 can generate the signal 1005, and even perhaps generate other signals that can be utilized by the mote device 11, and convert the signal(s) to a frequency effective to recharge the power portions 17. Alternatively, the servicing device 50 can service the mote device 11 to properly service, charge, configure, attend to, or replace the mote device. The technique(s) used by the servicing device 50 upon interaction with the one or more mote device(s) can be programmed in the servicing device, or alternatively can be selected by user input (e.g., via a remote link—not illustrated) to the servicing device 50. A variety of techniques and/or mechanisms (that can include, but may not be limited to, software, hardware, firmware, electromechanical, and/or mechanical aspects) can be utilized to allow individuals to control the servicing operations of the servicing device. For example, in one embodiment, a user can interface with the controller user interface located directly on the servicing device. In other embodiments, the user can communicate with the servicing device utilizing a distinct remote-control unit (not shown), which is configured to provide wireless control communications with the servicing device. In certain embodiments, the energy from other signal(s) transmitted by the servicing device 50, the computer/controller 18, and/or another mote device 11 can be utilized to recharge the power portion 17.

In many embodiments, if the servicing device 50 is providing the signal 1005 for the purpose of recharging the mote device 11, reposition the mote device 11, attend to the mote device 11, or perform some other operation with respect to the mote device 11, then the mote device 11 may be configured to understand that this is the purpose of the signal. As such, a variety of communication techniques can be utilized between the servicing device 50 in the mote device 11 to set up the transfer of energy via the signal 1005. For example, the mote device 11 should be aware of the frequency of the signal 1005, so that the mote device 11 can ensure that it is able to convert the electrical energy of that signal into a frequency that can be utilized to charge the undercharged rechargeable power portions 17.

While the FIG. 10 embodiment illustrates the signal 1005 that charges the power portion 17 of the mote device 11 as originating from the servicing device 50, the signal 1005 can be provided by a variety of other devices such as a charging device. For example, in certain embodiments, the servicing device 50, a person using the servicing device, or a person acting alone can locate those mote device(s) 11 that need to be charged. Thereupon, the servicing device 50 (or a servicing person) can position a signal-charging device (not shown) that emits a charging signal in sufficiently close proximity to the rechargeable mote device for a sufficient duration to charge the mote device using the signal 1005. Alternatively, the mote device can be returned to a remote location for charging either using traditional charging techniques or using a signal-charging technique. Within this disclosure, the signal 1005 can by configured as any type of electromagnetic radiation (including radio, electric, optical, infrared, ultraviolet) whose energy can be converted into a form which can at least partially charge the power portion 17.

By periodically utilizing the servicing device 50 and/or charging device to charge the mote device(s) 11, the energy levels of the mote device(s) in a mote network can be serviced to ensure and monitor for substantially continual operation. As such, the reliability of operation of certain embodiments of mote device(s) and their networks can be ensured. The servicing device 50 can thereby be configured to perform a wide variety of operations with respect to the mote device 11, that can include, but are not limited to: servicing the mote device, identifying those mote device(s) that need servicing, and/or charging an undercharged rechargeable mote device 11.

V. Examples of Computers/Controllers Associated with Mote Device(s)

Mote device(s) 11 can be applied to a large variety of sensing, measuring, and/or controlling applications, including but not limited to, sensing a variety of parameters as described with respect to FIGS. 1 to 3. It is envisioned that the role of a single mote device 11 can be changed, such as by reconfiguring the user interface, downloading different software, hardware, and/or firmware into the mote device, etc. Changing the role of the mote device 11 can provide different sensing applications and/or actuating applications based at least in part on varying the configuration or operation of software, hardware, or firmware of a computer/controller 18 that can be configured to interface with the mote device 11. This portion describes certain embodiments of the computer/controller 18 that may be configured to allow such functionality and alterability with respect to the mote device(s) 11, the computer/controller(s) 18, and/or the servicing device(s) 50. As such, the processor 605, the memory 607, the circuits 609, and/or the input/output 611 are illustrated as components of the mote device(s) 11, the computer/controller(s) 18, and the servicing device(s) 50 since each of these devices can be configured to perform processing operations and/or sense parameters at least partially using the mote device(s) 11. It is to be understood that the components 605, 607, 609, and/or 611 can be configured to perform similar or different task(s) in the mote device 11, the computer/controller 18, and the servicing device 50.

Many embodiments of mote device(s) 11 utilize processing, timing, filtering and/or other techniques when performing a variety of sensing operations. Such processing, timing, filtering, and/or other techniques can be at least partially performed and/or controlled within each individual mote device(s) 11 by using the controller portion 19. In many embodiments, the processing, timing, filtering, and/or other techniques can be at least partially controlled, externally of the mote device(s) 11, using the computer/controller 18. In many embodiments, the controller portion 19 integrated in certain embodiments of the mote device 11 can interoperate with the computer/controller 18 using known networking techniques. As such, depending upon the particular mote design, application, configuration, etc., a certain amount of the control of the operations of each mote device 11 can be provided either within the controller portion 19, or alternatively within the computer/controller 18.

FIG. 1 shows one embodiment of the computer/controller 18 (which can be embodied as a computer, microprocessor, microcontroller, electromechanical controller, etc.) as can be integrated within certain embodiments of the mote device(s) 11 to assist in providing the sharing of at least portions of data and/or other information associated with those mote device (s). In certain embodiments, the computer/controller 18 can be referred to as a base station. Certain operations and/or structures, as described with respect to the computer/controller 18 which is distinct from the mote device 11; can also apply to the controller portion 19 that is integrated within the mote device and/or the servicing device 50. As such, the particular location of software, hardware, and/or firmware that controls operation of the mote device(s) 11 can be distributed across the mote network, at least to those locations including the mote device(s) 11, the servicing device 50, and/or the computer/controller 18. Certain sensing-related aspects such as synchronization and/or designation of aspects (as described within this disclosure) can be performed by the computer/controller 18, the controller portion 19, and/or the servicing device 50. As such, in different embodiments, the mote device(s) can be operably coupled to each other, the servicing device 50, and/or the computer/controller 18 and much of the associated processing can be performed by any one of these devices, in a manner known by those skilled in the computer-networking art.

As described within this disclosure, multiple embodiments of the mote device(s) 11 are able to transfer a variety of data and/or information, etc. to each other via the antennas 12. One embodiment of the computer/controller 18 (that therefore may also be included in the controller portion 19 and/or the servicing device 50) includes a processor 605 such as a central processing unit (CPU), a memory 607, a circuit or a circuit portion 609, and an input output interface (I/O) 611. In certain embodiments, the I/O 611 may include a bus (not shown). In certain embodiments, the processor 605 can have a more limited capacity than perhaps a CPU, such as would occur if the computer/controller 18 included a microprocessor or microcomputer. Different embodiments of the computer/controller 18 can be a general-purpose computer, a specific-purpose computer, a microprocessor, a microcontroller, a personal display assistant (PDA), and/or any other known suitable type of computer or controller that can be implemented in hardware, software, electromechanical devices, and/or firmware. Certain portions of the computer/controller 18 can be physically or operably configurable in each mote device 11 such as described with respect to FIGS. 1 to 3. In certain embodiments of the mote device, the processor 605 as described with respect to FIG. 1 performs the processing and arithmetic operations for the computer/controller 18. The computer/controller 18 controls the signal processing, database querying and response, computational, timing, data transfer, and other processes associated with the mote device. In certain embodiments, one or more simplified versions of the computer/controller 18, the controller portion 19, and/or a similar controller in the servicing device 50 (not illustrated) can be provided with respect to FIG. 1, and could be configured to provide a transfer of data or other information and/or data between multiple mote device(s), the computer/controller 18, and/or the servicing device 50.

Certain embodiments of the memory 607 include random access memory (RAM) and read only memory (ROM) that together store the computer programs, operands, and other parameters that control the operation of the mote device. In certain embodiments, the memory can include flash memory or other similar memory components. The memory 607 can be configurable to contain the data or information obtained, retained, or captured by that particular mote device 11 (that may be configurable in different embodiments as the peripheral mote device of the obtaining mote device) such as are used to sense or measure a variety of parameters. Certain embodiments of mote device(s) can also be configured to actuate a variety of operations, such as turn a light (e.g., light emitting diode) on or off or control a display, computer monitor, etc.

In certain embodiments, the bus (not illustrated) can be configurable to provide for digital information transmissions between the processor 605, circuits 609, memory 607, and/or the I/O 611 as described with respect to FIG. 1. In this disclosure, the memory 607 can be configurable as RAM, ROM, flash memory, semiconductor-based memory, or any other type of memory that is configurable to store data or other information pertaining to motes. The bus also connects I/O 611 to the portions of the mote device(s) that either receive digital information from, or transmit digital information to, other devices (e.g., mote device(s) or other devices) of the mote network 10 or associated mote network.

Many embodiments of the antenna 12 can be configured as both transmitting and receiving devices. As such, each one of the mote device(s) 11, the servicing device 50, and/or the computer/controller 18 can be configured to transmit information to other devices, as well as to receive information from other devices. Each antenna 12 can be configured to provide effective communications to other devices, and therefore can include, but are not limited to, the radio frequency signals, wireless signals, optical signals, infrared signals, etc.

The memory 607 can provide one example of a memory storage portion that can, for example, store information or data relating to mote sensing, and/or computer instructions relating to device operations, etc. In certain embodiments, the monitored value includes, but is not limited to: a percentage of the memory 607, a certain amount of mote information that is stored in the memory 607, or at other locations associated with the mote information.

The memory 607 can be configured to provide for overflow, primary, secondary, or additional ability for the memory 607 of certain embodiments of the mote device 11, the servicing device, and/or the computer/controller 18 (e.g. when the monitored value of data within the memory 607 exceeds a prescribed value). Other embodiments of the memory 607 can be configurable as a mobile random access memory (RAM) device, a flash memory device, a semiconductor memory device, or any other memory device (that may or may not be distinct from the memory 607) that can store data or other information within the memory 607.

In certain embodiments of the mote device 11, the particular elements of the computer/controller 18 (e.g., the processor 605, the memory 607, the circuits 609, and/or the I/O 611) can provide a monitoring function to monitor the amount of data or information therein. Such a monitoring function by the mote device can be compared to a prescribed limit, such as whether the sensed information or data contained in the memory 607, the amount of data contained within the memory 607, or some other measure relating to the memory is approaching some level or value. In certain embodiments, the memory 607 stores data or information relating to the mote device. In certain embodiments the measure relating to the memory approaching some value may pertain to some sensed parameter, such as may be associated with the mote operation.

In certain embodiments, the I/O 611 provides an interface to control the transmissions of digital information between each of the components in the computer/controller 18. The I/O 611 also provides an interface between the components of the computer/controller 18 and different portions of the mote device. The circuits 609 can include such other user interface devices as a display and/or a keyboard (which can be varied, miniaturized, and/or be provided in a variety of graphical-based user interfaces for certain embodiments of mote device(s)).

VI. Examples of Mote Device(s) Indicating They Should be Serviced

A number of embodiments or configurations of servicing devices 50 are now described that can service one or more mote device(s) 11. In general, there may be a variety of reasons why certain mote device(s) should be serviced that include, but are not limited to, a) mote device(s) are failing to signal that they are still working, b) mote device(s) signaling that they are operating outside normal operational parameters (e.g., not working), and/or c) mote device(s) indicating that they have been working properly (e.g., the mote device has serviced data correctly over some prescribed time), but there is some reason to service the mote device (such as routine servicing, to collect data and return the mote device to service, or otherwise attend to the mote device).

In certain embodiments, the mote device can interface with the servicing device to indicate that, for at least one of the reasons described above, the mote device is requesting attention and is ready to be serviced. As such, in many embodiments, the mote device 11 can (e.g., by transmitting servicing attention requested signals), indicate to the servicing device that it is ready to be serviced.

Failing mote device(s) may signal to be serviced for a variety of reasons using a variety of techniques. In one embodiment, a last know location (using absolute geographic position or location with respect to another mote device within the mote network) of the failing mote device may be transmitted based on information transmitted to (or inferred or calculated by) other motes. In certain instances, a failing mote can broadcast its particular failure (or reason for servicing) and its location to neighbors, with the neighbor mote device(s) then storing the received location. The mote device(s) can thereupon indicate (e.g., using a status indicator such as a tag) that they can provide information to locate or provide the status of another mote device(s), and can therefore act as a referral device by utilizing a "referral" status indicator. Other mote device(s) or other devices that are searching to service the failed mote device can obtain the last known location from the referral device in an effort to locate the failed mote device.

Flowcharts that can be associated with the mote device(s) are also described. Within the disclosure, flowcharts of the type described in this disclosure can apply to method steps as performed by a computer or controller. The flowcharts can also apply to computer/controller 18 that interfaces with the mote device(s) 11. In certain embodiments, the computer/controller 18 (that includes, e.g., a general-purpose computer or specialized-purpose computer whose structure along with the software, firmware, electromechanical devices, and/or hardware), can perform the process or technique described in the flowchart.

Figure 11:
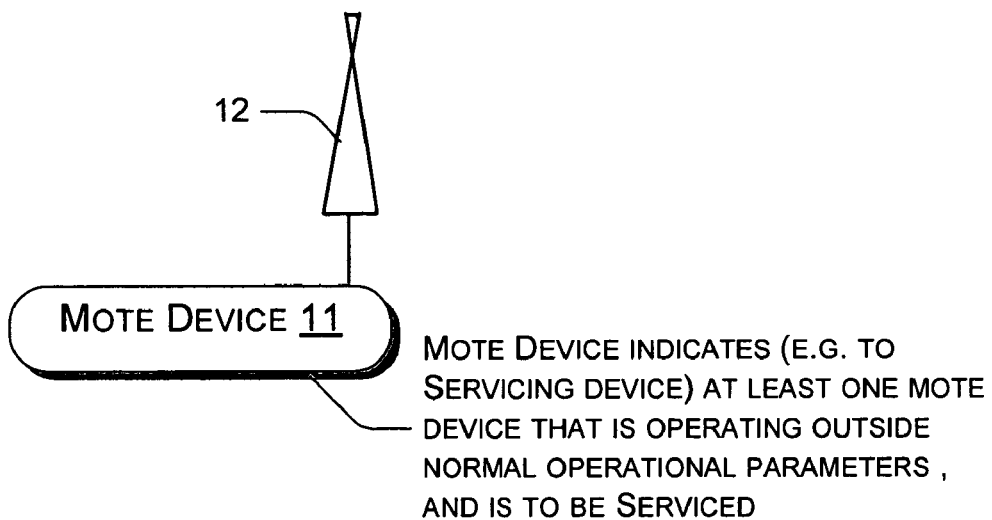
FIG. 11 shows a block diagram of one embodiment of the mote device.

FIG. 11 shows one embodiment of a mote device 11, as described within this disclosure; certain embodiments of which can store parametric information sensed by the mote device(s), and/or computer instructions, commands, etc. This disclosure thereby provides a mechanism including at least one mote device operable to at least partially determine that it is operating outside normal operational parameters and should be serviced (e.g., operating improperly), and also including the at least one mote device operable to indicate it should be serviced at least partially in response to the at least one mote device operable to at least partially determine that it is operating outside normal operational parameters and should be serviced. In certain embodiments, the at least one mote device(s) 11 should be serviced for a variety of reasons that include that it might not contain sufficient power, and as such is operating outside normal operational parameters. The power to the mote device(s), as described in this disclosure, can be provided by batteries, power cells, and/or other power-related devices. There can be a variety of other reasons, as described in the disclosure, about why the at least one mote device can be considered as operating outside normal operational parameter(s). In certain embodiments, once those mote device(s) indicate that they are operating outside the normal operational parameter(s) to at least one servicing device or servicing person, then the servicing device or person can take an appropriate action to service the mote device(s). With certain mote networks but not others, one or more embodiments of servicing devices or persons can thereupon service the at least one mote device as described in this disclosure. For example, if the mote device is configured as described with respect to FIGS. 1-3, and the servicing device is configured as described with respect to FIG. 7, then the user of the mote device will be able to indicate if they should be serviced. The respective locations of the mote device(s) could thereupon be determined based upon information provided by the mote device. Servicing the mote device could be determined at a variety of locations including: the mote device, at least one other mote device, at the servicing device, and/or by a person acting to service the mote device(s), etc. By comparison, if the servicing device 50 is configured to automatically service the mote device(s) similar to as described with respect to FIG. 8, then upon identification of the mote device(s) to service, the servicing device will automatically service those mote device(s) using robotic or other automated techniques.

One embodiment of a high-level flowchart of a processing and/or sharing technique 2000 is described with respect to FIGS. 12*a* to 12*e* and includes, but is not limited to, operation 2002 and 2004 as well as optional operations 2006, 2008, 2010, 2012, 2014, and/or 2016. Operation 2002 can include, but is not limited to, optional operations 2020, 2022, 2023, 2024, 2025, 2026, 2028, 2030, 2032, 2034, 2036, and/or 2038. Operation 2004 can include, but is not limited to, optional operations 2050, 2052, 2054, 2056, 2058, 2060, 2062, 2064, 2066, 2068, 2070, and/or 2072. The high-level flowchart of FIGS. 12*a* to 12*e* should be considered in combination with the mote device 11, as described with respect to FIG. 11. One embodiment of operation 2002 can include, but is not limited to, determining that at least one mote device is operating outside normal operational parameters and should be serviced. For example, determining the mote device is operating outside normal operational parameters in some fashion that could be remedied by servicing the mote device (such as, but not limited to): determining a low-power status of the mote device or associated battery, determining a mote device memory storage full or near full status, determining at least one portion of the mote device that is broken and/or operating improperly, etc. In different embodiments, the determining that the at least one mote device is operating outside normal operational parameters could occur in the past, in the present, and/or potentially as a prediction in the future as a trend. One embodiment of operation 2004 can include, but is not limited to, indicating the at least one mote device is to be serviced at least partially in response to the determining that the at least one mote device is operating outside normal operational parameters and should be serviced. For example, the mote device indicating (e.g., to itself, another mote device, and/or another device such as a computer/controller) that the mote device is operating outside normal operational parameters and should be serviced. One embodiment of the determining that at least one mote device is operating outside normal operational parameters and should be serviced of operation 2002 can include operation 2020, that can include, but is not limited to, determining at least partially using the at least one mote device that is operationally located within a mote network is not meeting a goal of the at least one mote device with respect to the mote network and should be serviced. For example, determining that the at least one mote device is not meeting at least one goal as determined with respect to the mote network, such as but not limited to: determining that a certain number of mote device(s) within the mote networks that are not operating properly; determining that a certain interaction between the different mote device(s) within the mote network is not occurring as desired; and/or determining that certain data is not being processed and/or stored in at least one mote device and/or computer/controller as desired. One embodiment of the determining that at least one mote device is operating outside normal operational parameters and should be serviced of operation 2002 can include operation 2022, that can include, but is not limited to, determining that the at least one mote device is operating outside normal operational parameters and should be reconfigured. For example, data contained within the at least one mote device, components associated with the at least one mote device, and/or other mote device(s) 11 that are associated with the at least one mote device could be serviced such as being reconfigured either in situ or after returning the at least one mote device to a remote location. One embodiment of the determining that at least one mote device is operating outside normal operational parameters and should be serviced of operation 2002 can include operation 2023, that can include, but is not limited to, determining that the at least one mote device is operating outside normal operational parameters and should be discarded. For example, data contained within the at least one mote device, components associated with the at least one mote device, and/or other mote device(s) 11 that are associated with the at least one mote device could be serviced such as being discarded. One embodiment of the determining that at least one mote device is operating outside normal operational parameters and should be serviced of operation 2002 can include operation 2024, that can include, but is not limited to, determining that the at least one mote device is operating outside normal operational parameters and should be collected. For example, the at least one mote device is collected (e.g., by the servicing device or by a servicing person as described herein), and is either serviced in situ or after displacing the at least one mote device to a remote location. One embodiment of the determining that at least one mote device is operating outside normal operational parameters and should be serviced of operation 2002 can include operation 2025, that can include, but is not limited to, determining that the at least one mote device is operating outside normal operational parameters and should be replaced. For example, data contained within the at least one mote device, components associated with the at least one mote device, and/or other mote device(s) 11 that are associated with the at least one mote device could be serviced such as being replaced. One embodiment of the determining that at least one mote device is operating outside normal operational parameters and should be serviced of operation 2002 can include operation 2026, that can include, but is not limited to, determining that the at least one mote device is operating outside normal operational parameters and should be repaired in situ. For example, determining that the at least one mote device should be repaired in situ, such as by the servicing device and/or by a person servicing the at least one mote device and/or mote network. One embodiment of the determining that at least one mote device is operating outside normal operational parameters and should be serviced of operation 2002 can include operation 2028, that can include, but is not limited to, determining that the at least one mote device is operating outside normal operational parameters and should be recharged. For example, determining that a rechargeable embodiment of the at least one mote device (or a rechargeable battery located therein) has insufficient power and/or energy, and should be recharged. One embodiment of the determining that at least one mote device is operating outside normal operational parameters and should be serviced of operation 2002 can include operation 2030, that can include, but is not limited to, determining that the at least one mote device is operating outside normal operational parameters and should be operationally transferred from a first mote network to a second mote network. For example, determining that the at least one mote device should be operationally transferred from the first mote network to the second mote network (e.g., the at least one mote device should be reconfigured to provide suitable operation for the at least one mote device in the second mote network). One embodiment of the determining that at least one mote device is operating outside normal operational parameters and should be serviced of operation 2002 can include operation 2032, that can include, but is not limited to, determining that the at least one mote device does not have access to a sufficient power to operate properly and should be serviced. For example, determining that the at least one mote device has insufficient power to operate properly. One embodiment of the determining that at least one mote device is operating outside normal operational parameters and should be serviced of operation 2002 can include operation 2034, that can include, but is not limited to, determining that a battery that provides power to the at least one mote device does not provide a sufficient power to the at least one mote device for the at least one mote device to operate properly, and should be serviced. For example, determining that a battery of the at least one mote device is operating outside the normal operational parameters by providing insufficient power to the at least one mote device for the latter to operate properly. One embodiment of the determining that at least one mote device is operating outside normal operational parameters and should be serviced of operation 2002 can include operation 2036, that can include, but is not limited to, determining that the at least one mote device does not have adequate data storage capabilities to operate properly, and should be serviced. For example, determining that the at least one mote device is operating outside the normal operational parameters by having insufficient data storage capabilities (e.g., its memory is filled). One embodiment of the determining that at least one mote device is operating outside normal operational parameters and should be serviced of operation 2002 can include operation 2038, that can include, but is not limited to, determining that a computation time of the at least one mote device exceeds a prescribed duration, and should be serviced. For example, determining that the computation time of the at least one mote device is excessive, such as determined by the at least one mote device utilizing excessive time to perform at least one process. One embodiment of the indicating the at least one mote device is to be serviced of operation 2004 can include operation 2050, that can include but is not limited to, indicating the at least one mote device is to be serviced at least partially using a status indicator operationally associated with the at least one mote device. For example, the status indicator indicates the at least one mote device is to be serviced. In different embodiments, the status indicator can include, but is not limited to: the at least one mote device changing color, changing reflectivity, emitting light, emitting a sound signal, vibrating, changing shape, changing feel upon contact, etc. as described within this disclosure. One embodiment of the indicating the at least one mote device is to be serviced of operation 2004 can include operation 2052, that can include but is not limited to, indicating the at least one mote device is to be serviced at least partially using a shape of the at least one mote device. For example, the at least one mote device changes shape to indicate the mote device should be serviced. One embodiment of the indicating the at least one mote device is to be serviced of operation 2004 can include operation 2054, that can include but is not limited to, indicating the at least one mote device is to be serviced at least partially using a position of the at least one mote device. For example, the at least one mote device changes position (e.g., the mote device jackknifes to an open position, or flips over displaying a different color or reflectivity) to indicate it should be serviced. One embodiment of the indicating the at least one mote device is to be serviced of operation 2004 can include operation 2056, that can include but is not limited to, indicating the at least one mote device is to be serviced at least partially using a change in conformation of the at least one mote device. For example, the at least one mote device changes its conformation, and thereby may be located at a different height above the ground, a road, or another surface to indicate that the at least one mote device should be serviced. One embodiment of the indicating the at least one mote device is to be serviced of operation 2004 can include operation 2058, that can include but is not limited to, indicating the at least one mote device is to be serviced at least partially using a change in color of the at least one mote device. For example, the at least one mote device changes color (e.g., to a highly-visible color depending upon its location) to indicate that it should be serviced. Such changing of color can be provided, for example, by the use of tags that are configured to change color. One embodiment of the indicating the at least one mote device is to be serviced of operation 2004 can include operation 2060, that can include but is not limited to, indicating the at least one mote device is to be serviced at least partially using a light signal of the at least one mote device. For example, the at least one mote device emits the light signal, such as by using a light-emitting device (e.g., light emitting diode) included in the at least one mote device. One embodiment of the indicating the at least one mote device is to be serviced of operation 2004 can include operation 2062, that can include but is not limited to, indicating the at least one mote device is to be serviced at least partially using an auditory signal of the at least one mote device. For example, a sound-producing device located in, and actuatable by, the at least one mote device produces a sound to indicate that it should be collected. One embodiment of the indicating the at least one mote device is to be serviced of operation 2004 can include operation 2064, that can include but is not limited to, indicating the at least one mote device is to be serviced at least partially using a vibration of the at least one mote device. For example, a vibratory device (not shown) that is located in the at least one mote device vibrates to indicate that it should be serviced. Within this disclosure, the term "vibrating" is intended to be broad to include such actions as chirping, buzzing, screeching, humming, etc. One embodiment of the indicating the at least one mote device is to be serviced of operation 2004 can include operation 2066, that can include but is not limited to, indicating the at least one mote device is to be serviced using at least one chemical tag or at least one fluorescent tag. For example, a chemical or fluorescent tag is actuated by the at least one mote device to indicate the latter should be serviced. One embodiment of the indicating the at least one mote device is to be serviced of operation 2004 can include operation 2068, that can include but is not limited to, indicating the at least one mote device is to be serviced to at least one other mote device. For example, indicating to at least one other mote device that the at least one mote device should be serviced. One embodiment of the indicating the at least one mote device is to be serviced of operation 2004 can include operation 2070, that can include but is not limited to, indicating the at least one mote device is to be serviced to a servicing device. For example, indicating to a servicing device that the at least one mote device should be serviced. One embodiment of the indicating the at least one mote device is to be serviced of operation 2004 can include operation 2072, that can include but is not limited to, indicating the at least one mote device is to be serviced to a controller device. For example, indicating to a controller (such as the controller/computer as described in this disclosure) that the at least one mote device should be serviced. One embodiment of operation 2006 can include, but is not limited to, sensing at least one parameter using the at least one mote device. For example, sensing a parameter such as, but not limited to, temperature, light level, sound level, position, velocity, etc. using the at least one mote device. One embodiment of operation 2008 can include, but is not limited to, actuating at least a portion of at least one other device using the at least one mote device. For example, actuating at least a portion of the device (e.g., a mote-controlled device) using the at least one mote device. One embodiment of operation 2010 can include, but is not limited to, displaying an image at least partially using the at least one mote device. For example, displaying at least a portion of an image (e.g., by actuating picture-elements, pixels, or light sources) using the at least one mote device. One embodiment of operation 2012 can include, but is not limited to, identifying a sensed condition of the at least one mote device. For example, identifying the sensed condition of the at least one mote device such as data storage, at least one parameter, etc. One embodiment of operation 2014 can include, but is not limited to, identifying a sensed error condition of the at least one mote device. For example, sensing an indication of an error (e.g., of a mote device operation) by the at least one mote device. One embodiment of operation 2016 can include, but is not limited to, identifying a sensed diagnostic test failure of the at least one mote device. For example, sensing a diagnostic test failure such as to determine that the at least one mote device is operating improperly, as described within this disclosure. The order of the operations, methods, mechanisms, etc. as described with respect to FIGS. 12*a* to 12*e* are intended to be illustrative in nature, and not limited in scope.

Figure 13:
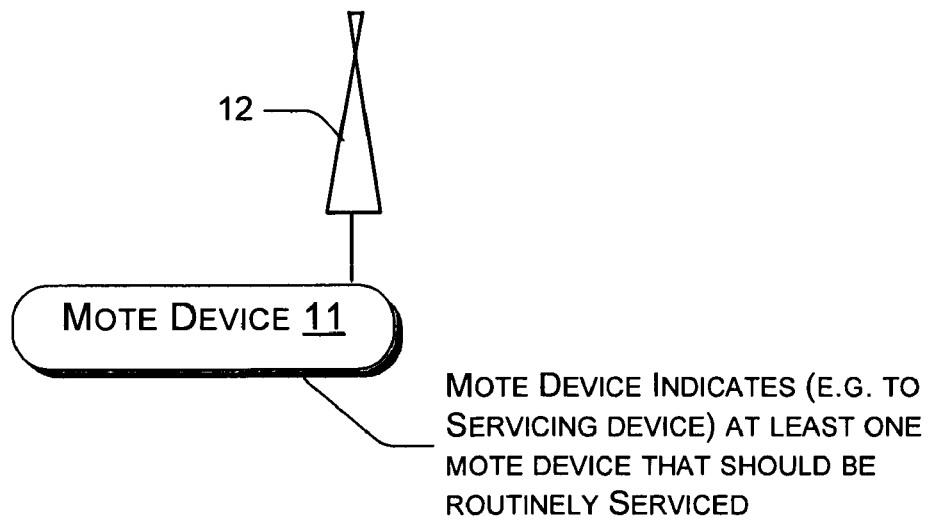
FIG. 13 shows a block diagram of another embodiment of the mote device.
Figure 12A:
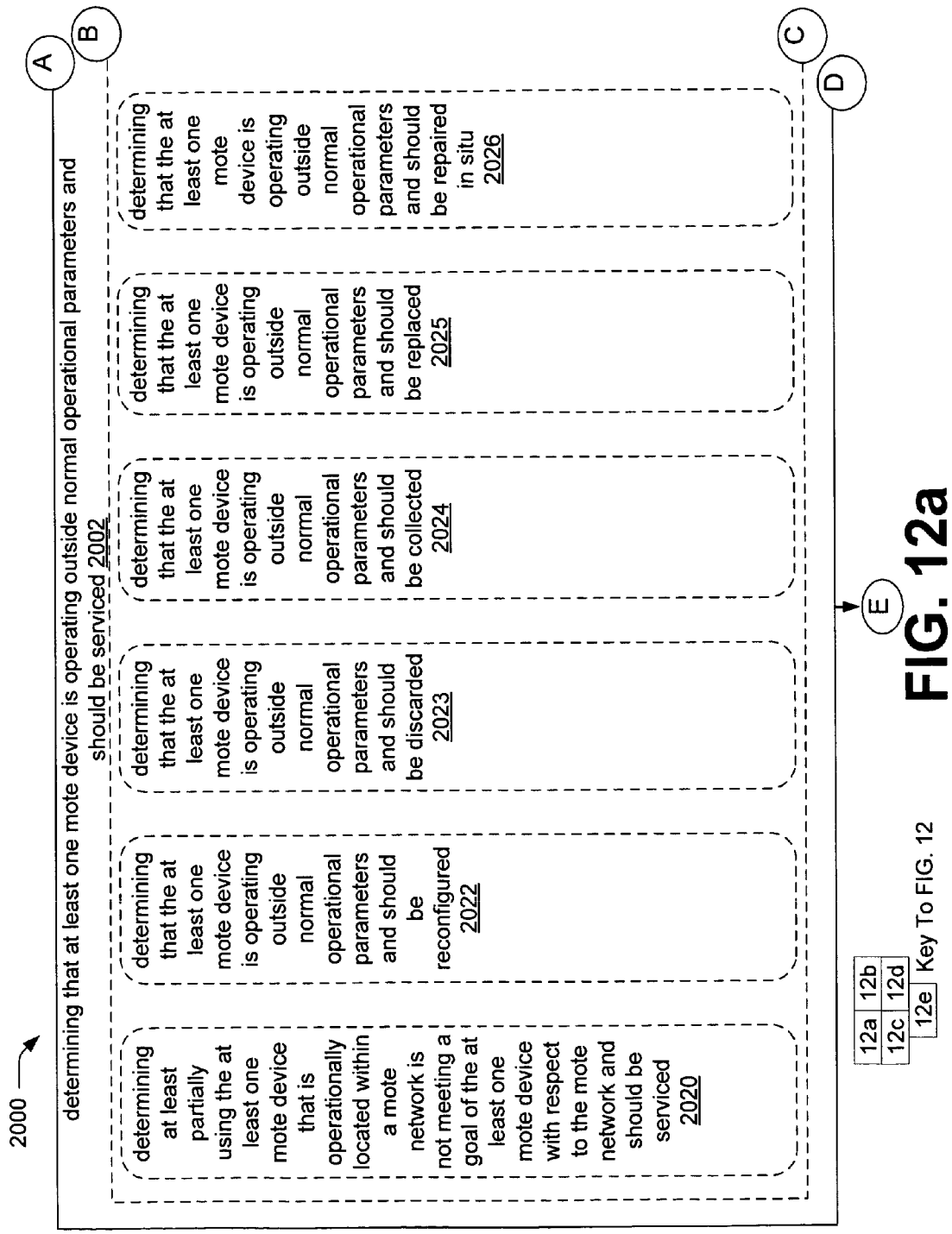
FIGS. 12a, 12b, 12c, 12d, and 12e, is a flow diagram of one embodiment of a mote identifying/servicing technique.
Figure 12B:
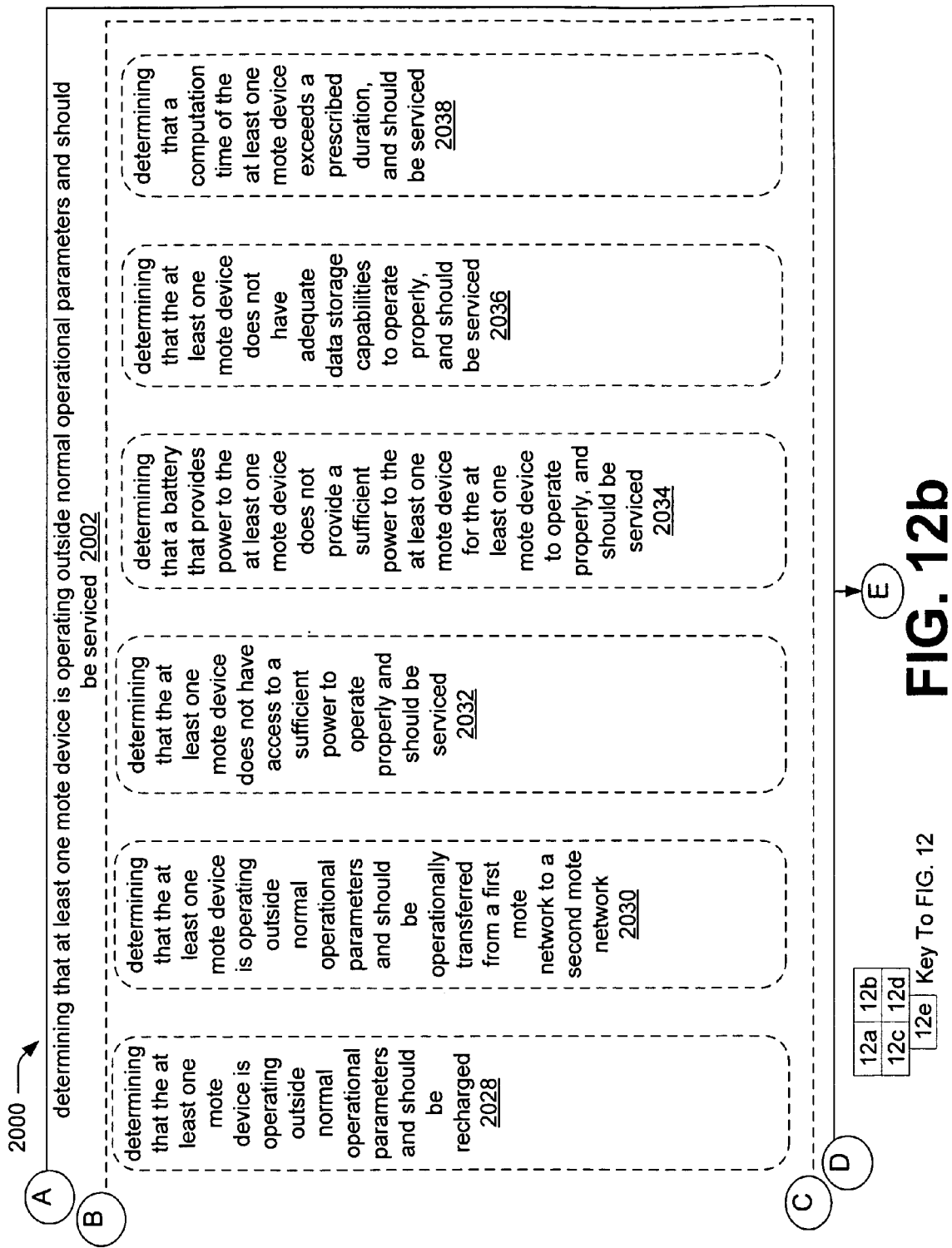
Figure 12C:
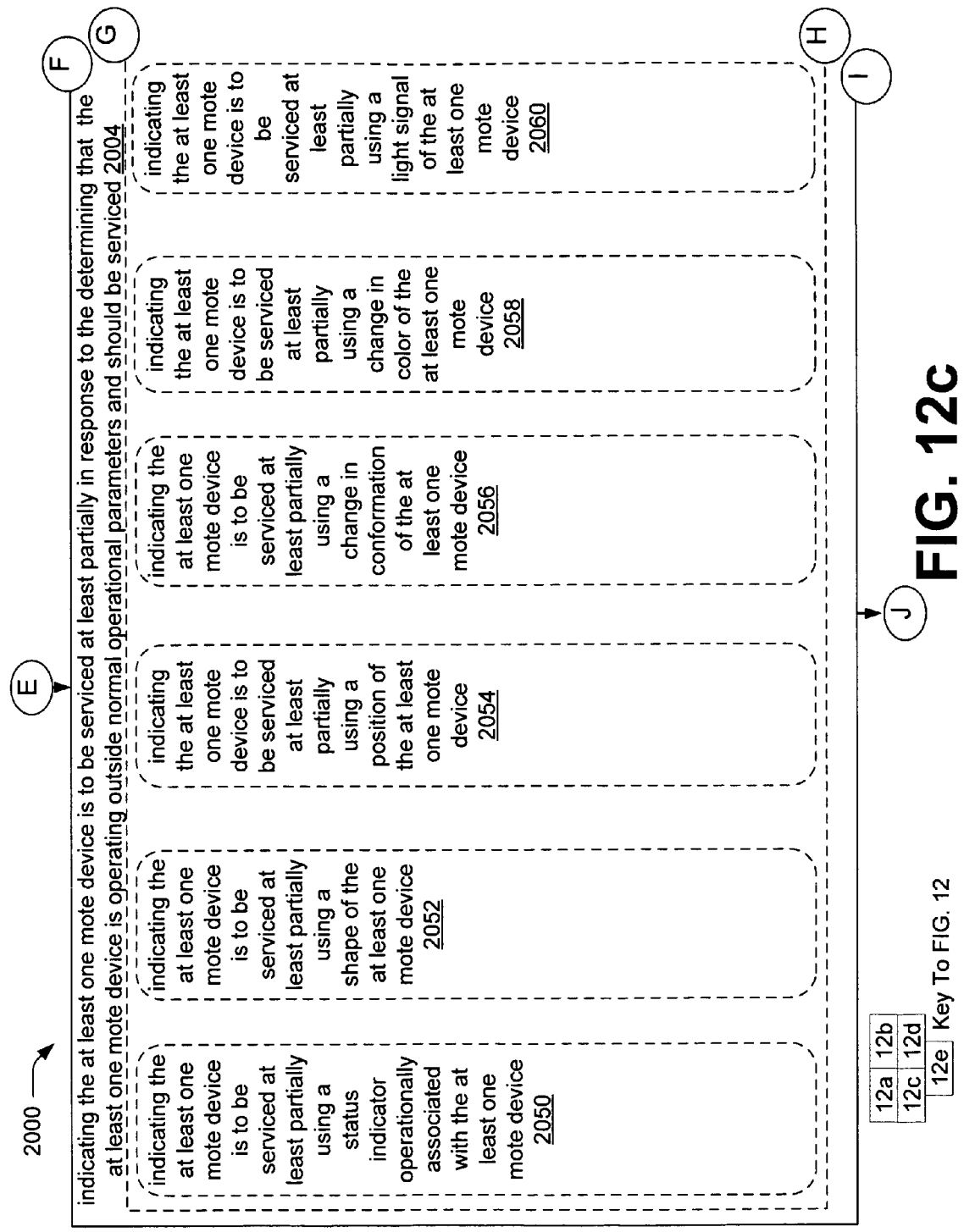
Figure 12D:
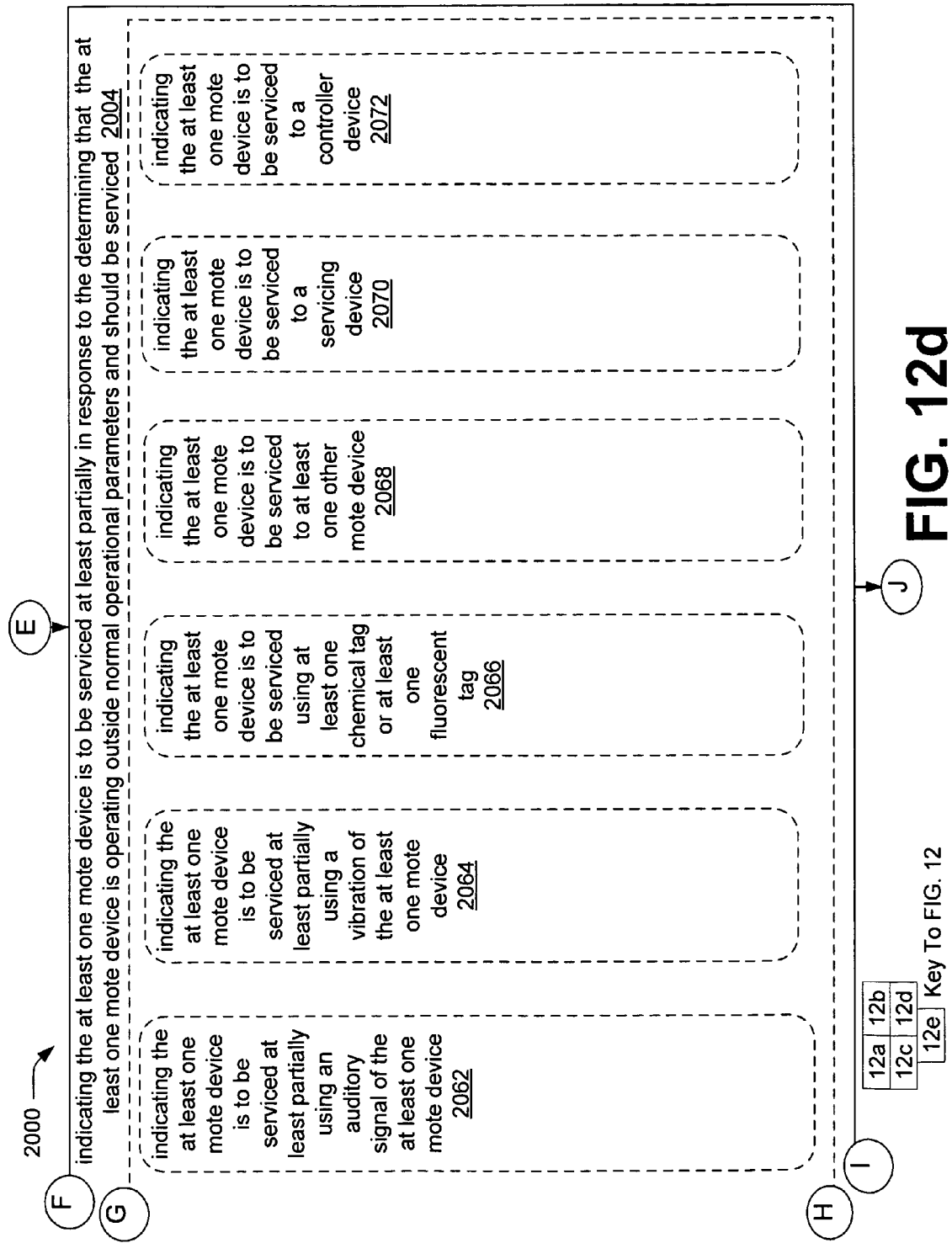
Figure 12E:
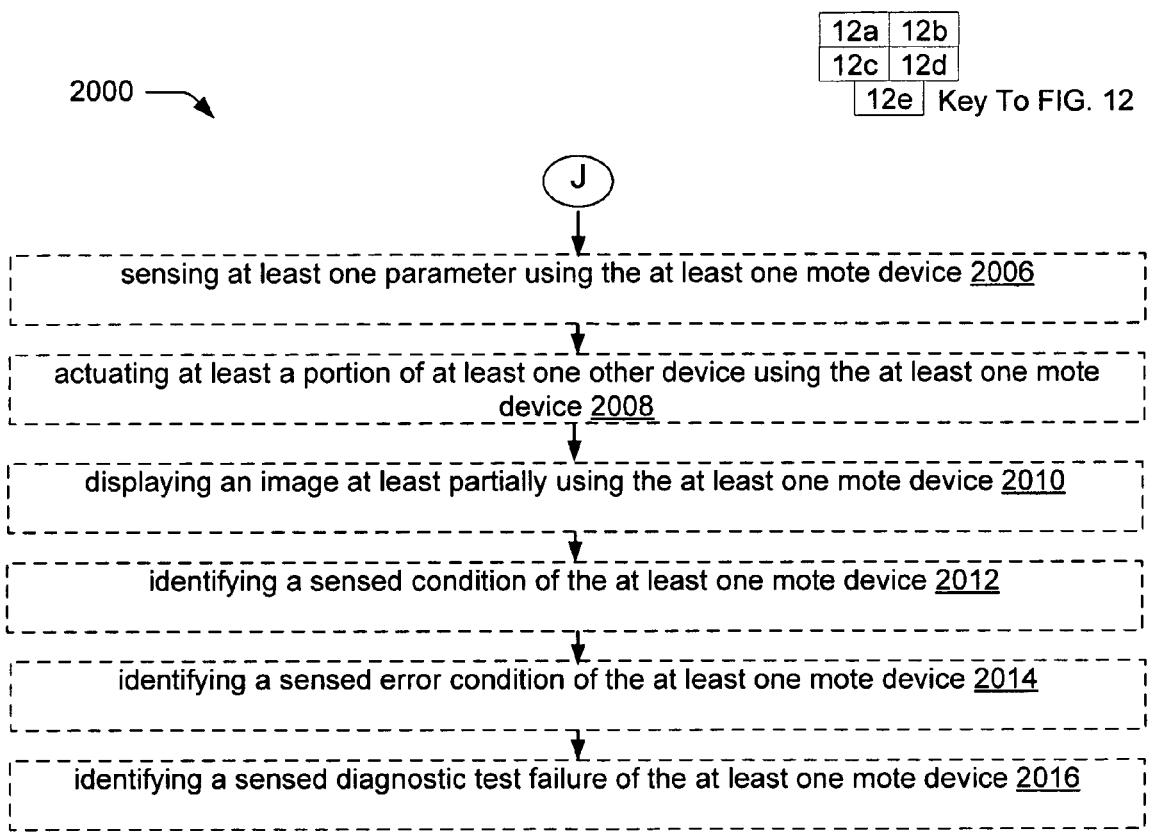

FIG. 13 shows one embodiment of a mote device 11, as described within this disclosure; certain embodiments of which can store parametric information sensed by the mote device(s), and/or computer instructions, commands, etc. This disclosure thereby provides a mechanism including the at least one mote device operable to at least partially determine that it should undergo routine servicing (e.g., operating improperly), and including the at least one mote device operable to indicate the at least one mote device should be serviced at least partially in response to the at least one mote device operable to at least partially determine that it should undergo routine servicing. In certain embodiments, the at least one mote device(s) 11 should undergo routine servicing for a variety of reasons that include that it might not contain sufficient power and should be recharged, and/or that the at least one mote device has been operating for a sufficient duration to be routinely serviced. In certain embodiments, once those mote device(s) that are to be serviced indicate this to at least one servicing device or servicing person; with certain mote networks but not others, one or more embodiments of servicing devices or persons can thereupon service the at least one mote device as described in this disclosure. For example, if the mote device is configured as described with respect to FIGS. 1-3, and the servicing device is configured as described with respect to FIG. 7, then the user of the servicing device could be able to indicate those mote device(s) that should be serviced. The respective locations of the mote device(s) could thereupon be determined based upon information provided by the mote device. The fact that the mote device should be serviced could be determined at the mote device, at least one other mote device, at the servicing device, and/or by a person acting to service the mote device(s). By comparison, if the servicing device 50 is configured to automatically service the mote device(s) similar to as described with respect to FIG. 8, then upon identification of the mote device(s) to service, the servicing device could automatically service those mote device(s) using robotic or other automated techniques.

Figure 14B:
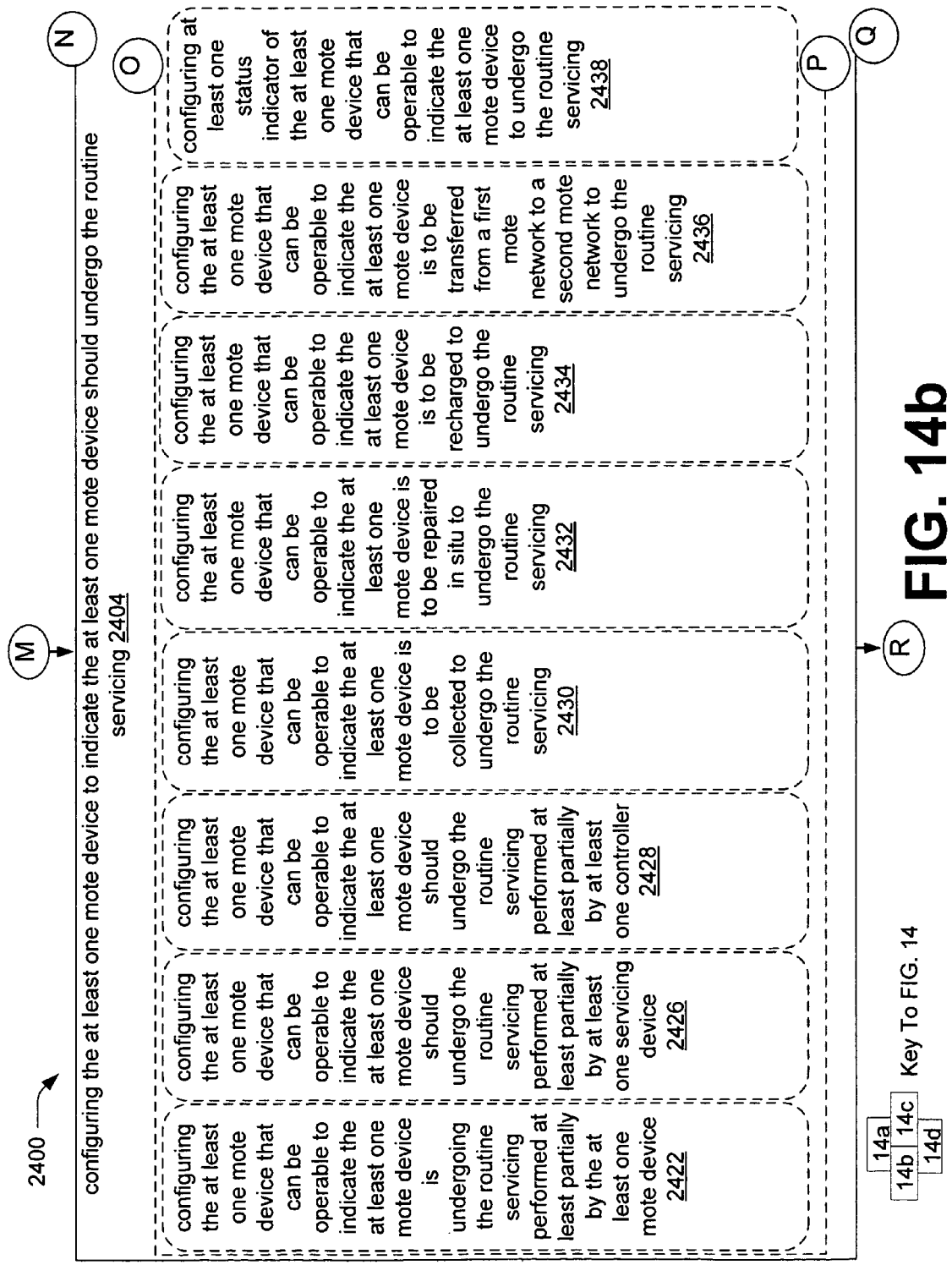
Figure 14C:
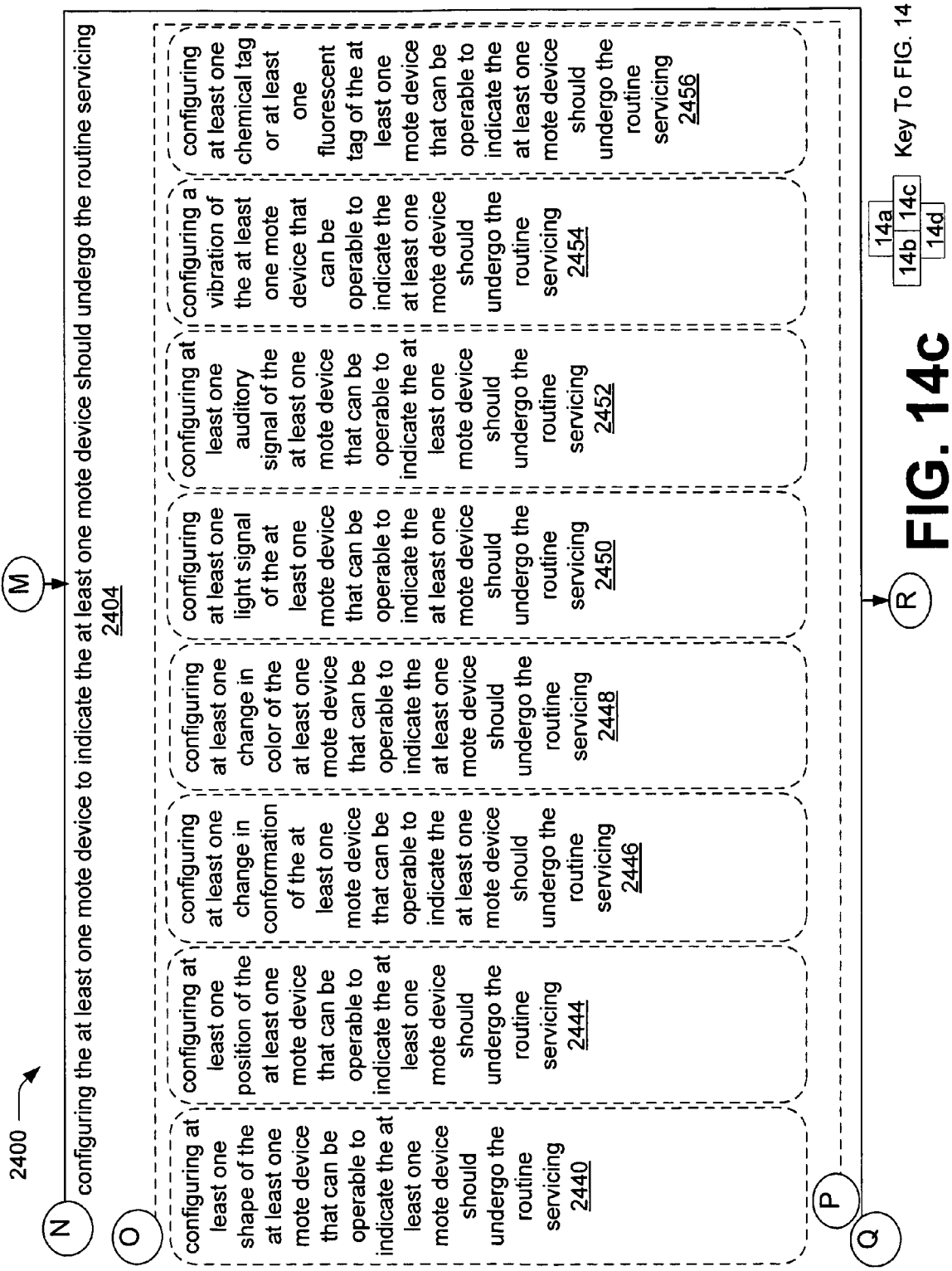

One embodiment of a high-level flowchart of a processing and/or sharing technique 2400 is described with respect to FIGS. 14a to 14c and includes, but is not limited to, operation 2402 and 2404 as well as optional operations 2406, 2408, 2410, 2412, 2414, 2416, 2418, and/or 2419. Operation 2402 can include, but is not limited to, optional operation 2420. Operation 2404 can include, but is not limited to, optional operations 2422, 2426, 2428, 2430, 2432, 2434, 2436, 2438, 2440, 2444, 2446, 2448, 2450, 2452, 2454, and/or 2456. The high-level flowchart of FIGS. 14a to 14c should be considered in combination with the mote device 11, as described with respect to FIG. 13. One embodiment of operation 2402 can include, but is not limited to, determining that at least one mote device should undergo routine servicing. For example, determining that the at least one mote device has been operating properly. One embodiment of operation 2404 can include, but is not limited to, configuring the at least one mote device to indicate the at least one mote device should undergo the routine servicing. For example, the at least one mote device indicates that it should undergo routine servicing. One embodiment of the determining that at least one mote device should undergo routine servicing of operation 2402 can include operation 2420, that can include, but is not limited to, determining at least partially using the at least one mote device that is at least partially located within a mote network should undergo the routine servicing to meet a goal of the at least one mote device with respect to the mote network. For example, the at least one mote device determines that is should undergo routine servicing to meet the goal. One embodiment of the configuring the at least one mote device to indicate the at least one mote device should undergo the routine servicing of operation 2404 can include operation 2422, that can include, but is not limited to, configuring the at least one mote device that can be operable to indicate the at least one mote device is undergoing the routine servicing performed at least partially by the at least one mote device. For example, the at least one mote device indicates that it should undergo routine servicing as performed at least partially by itself. One embodiment of the configuring the at least one mote device to indicate the at least one mote device should undergo the routine servicing of operation 2404 can include operation 2426, that can include, but is not limited to, configuring the at least one mote device that can be operable to indicate the at least one mote device should undergo the routine servicing performed at least partially by at least one servicing device. For example, the at least one mote device indicates that it should undergo routine servicing as performed at least partially by the at least one servicing device. One embodiment of the configuring the at least one mote device to indicate the at least one mote device should undergo the routine servicing of operation 2404 can include operation 2428, that can include, but is not limited to, configuring the at least one mote device that can be operable to indicate the at least one mote device should undergo the routine servicing performed at least partially by at least one controller. For example, the at least one mote device indicates that it should undergo routine servicing as performed at least partially by at least one controller. One embodiment of the configuring the at least one mote device to indicate the at least one mote device should undergo the routine servicing of operation 2404 can include operation 2430, that can include, but is not limited to, configuring the at least one mote device that can be operable to indicate the at least one mote device is to be collected to undergo the routine servicing. For example, the at least one mote device indicating such routine servicing as it should be collected, repaired, recharged, etc. One embodiment of the configuring the at least one mote device to indicate the at least one mote device should undergo the routine servicing of operation 2404 can include operation 2432, that can include, but is not limited to, configuring the at least one mote device that can be operable to indicate the at least one mote device is to be repaired in situ to undergo the routine servicing. For example, the at least one mote device indicating that it should be repaired. One embodiment of the configuring the at least one mote device to indicate the at least one mote device should undergo the routine servicing of operation 2404 can include operation 2434, that can include, but is not limited to, configuring the at least one mote device that can be operable to indicate the at least one mote device is to be recharged to undergo the routine servicing. For example, the least one mote device indicating that it should be recharged. One embodiment of the configuring the at least one mote device to indicate the at least one mote device should undergo the routine servicing of operation 2404 can include operation 2436, that can include, but is not limited to, configuring the at least one mote device that can be operable to indicate the at least one mote device is to be transferred from a first mote network to a second mote network to undergo the routine servicing. For example, the least one mote device indicating that it should be transferred from the first mote network to the second mote network. One embodiment of the configuring the at least one mote device to indicate the at least one mote device should undergo the routine servicing of operation 2404 can include operation 2438, that can include, but is not limited to, configuring at least one status indicator of the at least one mote device that can be operable to indicate the at least one mote device to undergo the routine servicing. For example, configuring the at least one status indicator to indicate that the at least one mote device should undergo the routine servicing. One embodiment of the configuring the at least one mote device to indicate the at least one mote device should undergo the routine servicing of operation 2404 can include operation 2440, that can include, but is not limited to, configuring at least one shape of the at least one mote device that can be operable to indicate the at least one mote device should undergo the routine servicing. For example, configuring the at least one shape of the at least one mote device to indicate that the at least one mote device should undergo the routine servicing. One embodiment of the configuring the at least one mote device to indicate the at least one mote device should undergo the routine servicing of operation 2404 can include operation 2444, that can include, but is not limited to, configuring at least one position of the at least one mote device that can be operable to indicate the at least one mote device should undergo the routine servicing. For example, configuring the at least one position of the at least one mote device to indicate that the at least one mote device should undergo the routine servicing. One embodiment of the configuring the at least one mote device to indicate the at least one mote device should undergo the routine servicing of operation 2404 can include operation 2446, that can include, but is not limited to, configuring at least one change in conformation of the at least one mote device that can be operable to indicate the at least one mote device should undergo the routine servicing. For example, configuring the at least one change in conformation of the at least one mote device to indicate that the at least one mote device should undergo the routine servicing. One embodiment of the configuring the at least one mote device to indicate the at least one mote device should undergo the routine servicing of operation 2404 can include operation 2448, that can include, but is not limited to, configuring at least one change in color of the at least one mote device that can be operable to indicate the at least one mote device should undergo the routine servicing. For example, configuring the at least one change in color of the at least one mote device to indicate that the at least one mote device should undergo the routine servicing. One embodiment of the configuring the at least one mote device to indicate the at least one mote device should undergo the routine servicing of operation 2404 can include operation 2450, that can include, but is not limited to, configuring at least one light signal of the at least one mote device that can be operable to indicate the at least one mote device should undergo the routine servicing. For example, configuring the at least one light signal of the at least one mote device to indicate that the at least one mote device should undergo the routine servicing. One embodiment of the configuring the at least one mote device to indicate the at least one mote device should undergo the routine servicing of operation 2404 can include operation 2452, that can include, but is not limited to, configuring at least one auditory signal of the at least one mote device that can be operable to indicate the at least one mote device should undergo the routine servicing. For example, configuring the at least auditory signal that can be produced by the at least one mote device to indicate that the at least one mote device should undergo the routine servicing. One embodiment of the configuring the at least one mote device to indicate the at least one mote device should undergo the routine servicing of operation 2404 can include operation 2454, that can include, but is not limited to, configuring a vibration of the at least one mote device that can be operable to indicate the at least one mote device should undergo the routine servicing. For example, configuring the at least one vibration of the at least one mote device to indicate that the at least one mote device should undergo the routine servicing. One embodiment of the configuring the at least one mote device to indicate the at least one mote device should undergo the routine servicing of operation 2404 can include operation 2456, that can include, but is not limited to, configuring at least one chemical tag or at least one fluorescent tag of the at least one mote device that can be operable to indicate the at least one mote device should undergo the routine servicing. For example, configuring the at least one chemical tag or at least one fluorescent tag of the at least one mote device to indicate that the at least one mote device should undergo the routine servicing. One embodiment of optional operation 2406 can include, but is not limited to, determining that the at least one mote device does not have access to a sufficient power. For example determining at the at least one mote device, an other mote device, or another device, that the at least one mote device does not have access to sufficient power. One embodiment of optional operation 2408 can include, but is not limited to, determining that a battery of the at least one mote device does not provide a sufficient power to the at least one mote device. For example determining at the at least one mote device, an other mote device, or another device, that a battery of the at least one mote device does not provide sufficient power. One embodiment of optional operation 2410 can include, but is not limited to, determining that the at least one mote device does not have adequate data storage capabilities to operate properly. For example determining at the at least one mote device, another mote device, or another device, that the at least one mote device does not have adequate data storage capabilities. One embodiment of optional operation 2412 can include, but is not limited to, determining that a computation time of the at least one mote device exceeds a prescribed duration. For example determining at the at least one mote device, another mote device, or another device, that the computation time of the at least one mote device exceeds the prescribed duration. One embodiment of optional operation 2414 can include, but is not limited to, sensing at least one parameter using the at least one mote device. For example, the at least one mote device senses the at least one parameter. One embodiment of optional operation 2416 can include, but is not limited to, actuating at least a portion of at least one other device using the at least one mote device. For example, the at least one mote device actuates the at least one other device. One embodiment of optional operation 2418 can include, but is not limited to, displaying at least a portion of an image at least partially using the at least one mote device. For example, the at least one mote device displays at least the portion of the image. One embodiment of optional operation 2419 can include, but is not limited to, identifying a sensed condition of the at least one mote device. For example, the mote device identifies the sensed condition. The order of the operations, methods, mechanisms, etc. as described with respect to FIGS. 14*a* to 14*c* are intended to be illustrative in nature, and not limited in scope.

One embodiment of a high-level flowchart of a processing and/or sharing technique 2500 is described with respect to FIG. 15 and includes, but is not limited to, operations 2502 and 2504. The high-level flowchart of FIG. 15 should be considered in combination with the mote device 11, as described with respect to FIG. 13. One embodiment of operation 2502 can include, but is not limited to, a mote means for determining that it is operating properly. For example, the mote device determines that it is operating properly based on, e.g., the mote device storing and/or transferring data or other information adequately. One embodiment of operation 2504 can include, but is not limited to, the mote means for indicating it is to undergo routine servicing even though it has determined that it is operating properly. For example, the mote device indicates that it should undergo routine servicing, with such servicing techniques being described in this disclosure. The order of the operations, methods, mechanisms, etc. as described with respect to FIG. 15 are intended to be illustrative in nature, and not limited in scope.

One embodiment of a high-level flowchart of a processing and/or sharing technique 2600 is described with respect to FIG. 16 and includes, but is not limited to, operations 2602 and 2604. The high-level flowchart of FIG. 16 should be considered in combination with the mote device 11, as described with respect to FIG. 11. One embodiment of operation 2602 can include, but is not limited to, a mote means for determining that it is operating outside normal operational parameters. For example, the mote device, as described in this disclosure, indicates that it is operating outside of normal operational parameters as described in this disclosure. One embodiment of operation 2604 can include, but is not limited to, the mote means for indicating it is to be serviced based, at least in part, on it determining that it is operating outside normal operational parameters. For example, the mote device as described in this disclosure indicating that it is to be serviced (e.g., collected, repaired, recharged, etc. such as described in this disclosure). The order of the operations, methods, mechanisms, etc. as described with respect to FIG. 16 are intended to be illustrative in nature, and not limited in scope.

Another embodiment of the at least one mote device is described with respect to FIG. 17. A displacing mechanism 2700 is configurable to displace the at least one mote device to indicate the at least one mote device is to undergo servicing. In certain embodiments, the displacing mechanism 2700 can include a flipping mechanism that is configurable to flip the at least one mote device. In certain embodiments, the displacing mechanism 2700 can be at least partially located in the at least one mote device. For example, the displacing mechanism can be located in the at least one mote device to flip or otherwise displace the at least one mote device. In other embodiments, the displacing mechanism 2700 can be at least partially located in the servicing device. For example, the displacing mechanism can be located in the servicing device to flip or otherwise displace the at least one mote device.

In one or more various aspects, related systems include but are not limited to circuitry and/or programming for effecting the herein-referenced method aspects; the circuitry and/or programming can be virtually any combination of hardware, software, electro-mechanical system, and/or firmware configurable to effect the herein-referenced method aspects depending upon the design choices of the system designer.

VII. Conclusion

This disclosure provides a number of embodiments of servicing techniques for one or more mote device(s) that can be integrated within mote networks. Each mote device can allow sensed data or information that is located at the one mote device to be transferred to another mote device or another device. The embodiments of the mote device(s) as described with respect to this disclosure are intended to be illustrative in nature, and are not limiting its scope.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle can vary with the context in which the processes and/or systems and/or other technologies are deployed. For example, if an implementer determines that speed and accuracy are paramount, the implementer may opt for mainly a hardware and/or firmware vehicle; alternatively, if flexibility is paramount, the implementer may opt for mainly a software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle can be deployed and the specific concerns (e.g., speed, flexibility, or predictability) of the implementer, any of which may vary.

The foregoing detailed description has set forth various embodiments of the mote device(s) and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", "operably linked", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

It is to be understood by those skilled in the art that, in general, that the terms used in the disclosure, including the drawings and the appended claims (and especially as used in the bodies of the appended claims), are generally intended as "open" terms. For example, the term "including" should be interpreted as "including but not limited to"; the term "having" should be interpreted as "having at least"; and the term "includes" should be interpreted as "includes, but is not limited to"; etc. In this disclosure and the appended claims, the terms "a", "the", and "at least one" located prior to one or more items are intended to apply inclusively to either one or a plurality of those items.

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that could have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that could have A alone, B alone, C alone, A and B together, A and C together, B and C together, and/or A, B, and C together, etc.).

Those skilled in the art will appreciate that the herein-described specific exemplary processes and/or devices and/or technologies are representative of more general processes and/or devices and/or technologies taught elsewhere herein, such as in the claims filed herewith and/or elsewhere in the present application.

Within this disclosure, elements that perform similar functions in a similar way in different embodiments may be provided with the same or similar numerical reference characters in the figures.

The invention claimed is:

1. A method, comprising:
   determining that at least one mote device should undergo routine servicing; and
   configuring the at least one mote device to indicate the at least one mote device should undergo the routine servicing, including configuring of the at least one mote device to automatically change its position to indicate the at least one mote device should undergo the routine servicing, including configuring the at least one mote device to indicate the at least one mote device should undergo the routine servicing even though the at least one mote device is operating properly.

2. The method of claim 1, wherein the determining that at least one mote device should undergo routine servicing comprises:
   determining at least partially using the at least one mote device that is at least partially located within a mote network that the at least one mote device should undergo the routine servicing to meet a goal of the at least one mote device with respect to the mote network.

3. The method of claim 1, wherein the configuring the at least one mote device to indicate the at least one mote device should undergo the routine servicing comprises:
   configuring the at least one mote device to indicate the at least one mote device is undergoing routine servicing performed at least partially by the at least one mote device.

4. The method of claim 1, wherein the configuring the at least one mote device to indicate the at least one mote device should undergo the routine servicing comprises:
   configuring the at least one mote device to indicate, by automatically changing its orientation, that the at least one mote device should undergo routine servicing performed at least partially by at least one servicing device.

5. The method of claim 1, wherein the configuring the at least one mote device to indicate the at least one mote device should undergo the routine servicing comprises:
   configuring the at least one mote device that can be operable to indicate the at least one mote device is to be collected to undergo the routine servicing.

6. The method of claim 1, wherein the configuring the at least one mote device to indicate the at least one mote device should undergo the routine servicing comprises:
   configuring the at least one mote device that can be operable to indicate the at least one mote device is to be repaired in situ to undergo the routine servicing.

7. The method of claim 1, wherein the configuring the at least one mote device to indicate the at least one mote device should undergo the routine servicing comprises:
   configuring the at least one mote device that can be operable to indicate the at least one mote device is to be transferred from a first mote network to a second mote network to undergo the routine servicing.

8. The method of claim 1, wherein the configuring the at least one mote device to indicate the at least one mote device should undergo the routine servicing comprises:
   configuring at least one status indicator of the at least one mote device that can be operable to indicate the at least one mote device to undergo the routine servicing.

9. The method of claim 1, wherein the configuring the at least one mote device to indicate the at least one mote device should undergo the routine servicing, including configuring at least one position of the at least one mote device that can be operable to indicate the at least one mote device should undergo the routine servicing comprises:
   configuring the at least one mote device to at least one of jackknife, flip, or change in a steady-state shape to indicate the at least one mote device should undergo the routine servicing.

10. The method of claim 1, wherein the configuring the at least one mote device to indicate the at least one mote device should undergo the routine servicing comprises:
    configuring a change in color of the at least one mote device that can be operable to indicate the at least one mote device should undergo the routine servicing.

11. The method of claim 1, wherein the configuring the at least one mote device to indicate the at least one mote device should undergo the routine servicing comprises:
    configuring at least one chemical tag or at least one fluorescent tag of the at least one mote device to be operable to change at least one tag property to indicate the at least one mote device should undergo the routine servicing.

12. The method of claim 1, further comprising:
    determining that the at least one mote device does not have access to a sufficient power.

13. The method of claim 1, further comprising:
    determining that the at least one mote device does not have adequate data storage capabilities to operate properly.

14. The method of claim 1, further comprising:
    sensing at least one parameter using the at least one mote device.

15. The method of claim 1, further comprising:
    actuating at least a portion of at least one other device using the at least one mote device.

16. The method of claim 1, further comprising:
    displaying at least a portion of an image at least partially using the at least one mote device.

17. A method, comprising:
indicating at least one mote device should be serviced by automatically changing at least one physical characteristic of the at least one mote device and that is visible to a human operator even though the at least one mote device has determined that it is operating properly; and
in response to said indicating, servicing at least one mote device to control at least one operation that the at least one mote device is configured to perform.

18. The method of claim 17, wherein the, servicing at least one mote device to control at least one operation that the at least one mote device is configured to perform further comprises:
servicing the at least one mote device to control at least one goal of the at least one mote device with respect to a mote network.

19. An apparatus, comprising:
at least one mote device operable to determine that it is operating outside normal operational parameters and should be serviced; and
the at least one mote device operable to indicate it should be serviced by the at least one mote device automatically displacing itself in response to the at least one mote device operable to determine that it is operating outside normal operational parameters and should be serviced, the at least one mote device configured to indicate the at least one mote device should undergo routine servicing even though the at least one mote device is operating within normal operational parameters.

20. The apparatus of claim 19, wherein the at least one mote device operable to indicate it should be serviced by automatically displacing itself in response to the at least one mote device operable to determine that it is operating outside normal operational parameters and should be serviced further comprises:
the at least one mote device operable to indicate it should be serviced by changing its own orientation, steady-state shape or color.

21. An apparatus, comprising:
at least one mote device operable to determine that it should undergo routine servicing; and
the at least one mote device operable to indicate the at least one mote device should be serviced at least partially in response to the at least one mote device operable to determine that is should undergo routine servicing, including being operable to indicate the at least one mote device should be serviced by the at least one mote device, the at least one mote device operable to indicate by automatically displacing itself that the at least one mote device should be serviced by the at least one mote device, the at least one mote device operable to indicate the at least one mote device should undergo the routine servicing even though the at least one mote device is operating properly.

22. The apparatus of claim 21, wherein the at least one mote device operable to indicate the at least one mote device should be serviced at least partially in response to the at least one mote device operable to determine that it should undergo routine servicing further comprises:
the at least one mote device operable to indicate by automatically changing its own orientation that the at least one mote device should be serviced by a servicing device.

23. An apparatus, comprising:
a displacing mechanism configurable to displace at least one mote device to indicate the at least one mote device is to undergo servicing, wherein the displacing mechanism includes a flipping mechanism configurable to flip the at least one mote device.

24. The apparatus of claim 23, wherein the displacing mechanism configurable to displace at least one mote device to indicate the at least one mote device is to undergo servicing comprises:
a flipping mechanism configurable to flip the at least one mote device to expose a different surface of the at least one mote device.

25. The apparatus of claim 23, wherein the displacing mechanism configurable to displace at least one mote device to indicate the at least one mote device is to undergo servicing comprises:
a displacing mechanism located at least partially in the at least one mote device that is configurable to displace the at least one mote device.

26. The apparatus of claim 23, wherein the displacing mechanism configurable to displace at least one mote device to indicate the at least one mote device is to undergo servicing comprises:
the displacing mechanism at least partially located in a servicing device that is configurable to displace the at least one mote device.

27. An apparatus, comprising:
a mote means for determining that it is operating properly; and
the mote means having a physical characteristic that is operable to be changed for indicating it is to undergo routine servicing even though it has determined that it is operating properly.

28. A system, comprising:
circuitry for determining that at least one mote device Is operating outside normal operational parameters and should be serviced; and
circuitry for visually indicating that the at least one mote device is to be serviced by automatically displacing the at least one mote device at least partially in response to the determining that the at least one mote device is operating outside normal operational parameters and should be serviced, the at least one mote device configured to indicate the at least one mote device should undergo routine servicing even though the at least one mote device is operating within normal operational parameters.

* * * * *